United States Patent
Arora et al.

(10) Patent No.: US 11,210,206 B1
(45) Date of Patent: Dec. 28, 2021

(54) SPOOFING STATEFUL DEPENDENCIES DURING SOFTWARE TESTING

(71) Applicant: Amazon Technologies, Inc., Seattle, WA (US)

(72) Inventors: Abhishek Arora, Seattle, WA (US); Onkar Walavalkar, Kirkland, WA (US); Aman Gupta, Seattle, WA (US); Xuetao Fan, Seattle, WA (US); Kurtis Robert Kuszmaul, Seattle, WA (US); Christopher Chandler, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/877,165

(22) Filed: May 18, 2020

(51) Int. Cl.
G06F 11/36 (2006.01)

(52) U.S. Cl.
CPC ........ G06F 11/3688 (2013.01); G06F 11/368 (2013.01); G06F 11/3684 (2013.01); G06F 11/3692 (2013.01)

(58) Field of Classification Search
USPC ....................................................... 717/124
See application file for complete search history.

(56) References Cited

U.S. PATENT DOCUMENTS

| | | | |
|---|---|---|---|
| 5,475,624 A | 12/1995 | West | |
| 6,502,102 B1 * | 12/2002 | Haswell | G06F 11/3664 |
| 6,601,192 B1 * | 7/2003 | Bowman-Amuah | G06F 11/3688 714/38.12 |
| 6,701,514 B1 * | 3/2004 | Haswell | G06F 11/3664 707/999.102 |
| 6,907,546 B1 * | 6/2005 | Haswell | G06F 11/3684 714/38.11 |
| 7,194,535 B2 | 3/2007 | Hannel et al. | |
| 8,245,194 B2 | 8/2012 | Atkin et al. | |

(Continued)

OTHER PUBLICATIONS

E. S. Reetz et al.; "How to Test IoT-based Services before Deploying them into Real World"; European Wireless 2013; 19th European Wireless Conference, pp. 1-6; 2013 (Year: 2013).*

(Continued)

*Primary Examiner* — Qing Chen
*Assistant Examiner* — Clint Thatcher
(74) *Attorney, Agent, or Firm* — Robert C. Kowert; Kowert, Hood, Munyon, Rankin & Goetzel, P.C.

(57) ABSTRACT

A service testing system is disclosed to enable consistent replay of stateful requests on a service whose output depends on the service's execution state prior to the requests. In embodiments, the service implements a compute engine that executes service requests and a storage subsystem that maintains execution states during the execution of stateful requests. When a stateful request is received during testing, the storage subsystem creates an in-memory test copy of the execution state to support execution of the request, and provides the test copy to the compute engine. In embodiments, the storage subsystem will create a separate instance of execution state for each individual test run. The disclosed techniques enable mock execution states to be easily created for testing of stateful requests, in a manner that is transparent to the compute engine and does not impact production execution data maintained by the service.

20 Claims, 17 Drawing Sheets

(56) References Cited

U.S. PATENT DOCUMENTS

| | | |
|---|---|---|
| 8,359,581 B2 | 1/2013 | Ortiz |
| 8,627,296 B1 | 1/2014 | Picard |
| 8,677,327 B2 | 3/2014 | Huang et al. |
| 8,799,875 B2 | 8/2014 | Ziegler et al. |
| 8,935,573 B2 | 1/2015 | Horsman et al. |
| 9,619,375 B2 | 4/2017 | Avgerinos et al. |
| 9,632,906 B2 | 4/2017 | Kraus et al. |
| 10,078,574 B2 | 9/2018 | Lopian |
| 2007/0234300 A1 | 10/2007 | Leake et al. |
| 2010/0005341 A1 | 1/2010 | Agarwal et al. |
| 2013/0205172 A1 | 8/2013 | Hudgons et al. |
| 2018/0129592 A1 | 5/2018 | Li |
| 2020/0089600 A1 | 3/2020 | Hachmeister et al. |

OTHER PUBLICATIONS

R. Tonjes et al.; "Automated Testing of Context-Aware Applications"; 2015 IEEE 82nd Vehicular Technology Conference (VTC2015-Fall), pp. 1-5; 2015 (Year: 2015).*

Christian Dehning; "When to use Fakes instead of Mocks"; Medium.com website [full url in ref.]; Jul. 7, 2017 (Year: 2017).*

U.S. Appl. No. 16/876,627, filed May 18, 2020, Abishek Arora et al.
U.S. Appl. No. 16/876,684, filed May 18, 2020, Abishek Arora et al.
U.S. Appl. No. 16/877,180, filed May 18, 2020, Abishek Arora et al.

\* cited by examiner

SPOOFING STATEFUL DEPENDENCIES DURING SOFTWARE TESTING

BACKGROUND

A cloud-based service provider provides computing resources to clients that the service provider manages in its service provider network. The service provider manages the operation of the computing resources to allow the resources to be efficiently and securely shared by multiple customers. Cloud-based services may be provided using groups of virtual compute and storage nodes. Such architectures allow the service to be easily scaled to accommodate very large customers, and automatically adjust its resources based on changing demand levels. These services are often stateful, where the service's response to a request will depend on an execution state of the service prior to the request. For example, a service that processes customer orders may maintain execution state over a sequence of customer requests to store data about an order, such as the contents of the customer's shopping cart, the customer's browsing history, and the shipment and payment options for the order, etc.

Replay testing is an important tool used to verify many types of software, including software that implements cloud-based services. While it is relatively straightforward to perform replay testing on stateless services that always return the same response for the same request, replaying requests on stateful services present a number of challenges. For stateful services, the execution state of the service is needed to correctly replay a request. However, a desired execution state for service may not always be available, as the state may have been overwritten in the production database. Moreover, replay testing using production data would impact live execution state data stored in the production database. Maintaining a full-scale test database for testing purposes is costly, and worse, a single test database may not be scalable to handle large numbers of test runs that rely on conflicting execution state data. Better systems are needed to carry out replay testing of stateful services.

Figure 1:
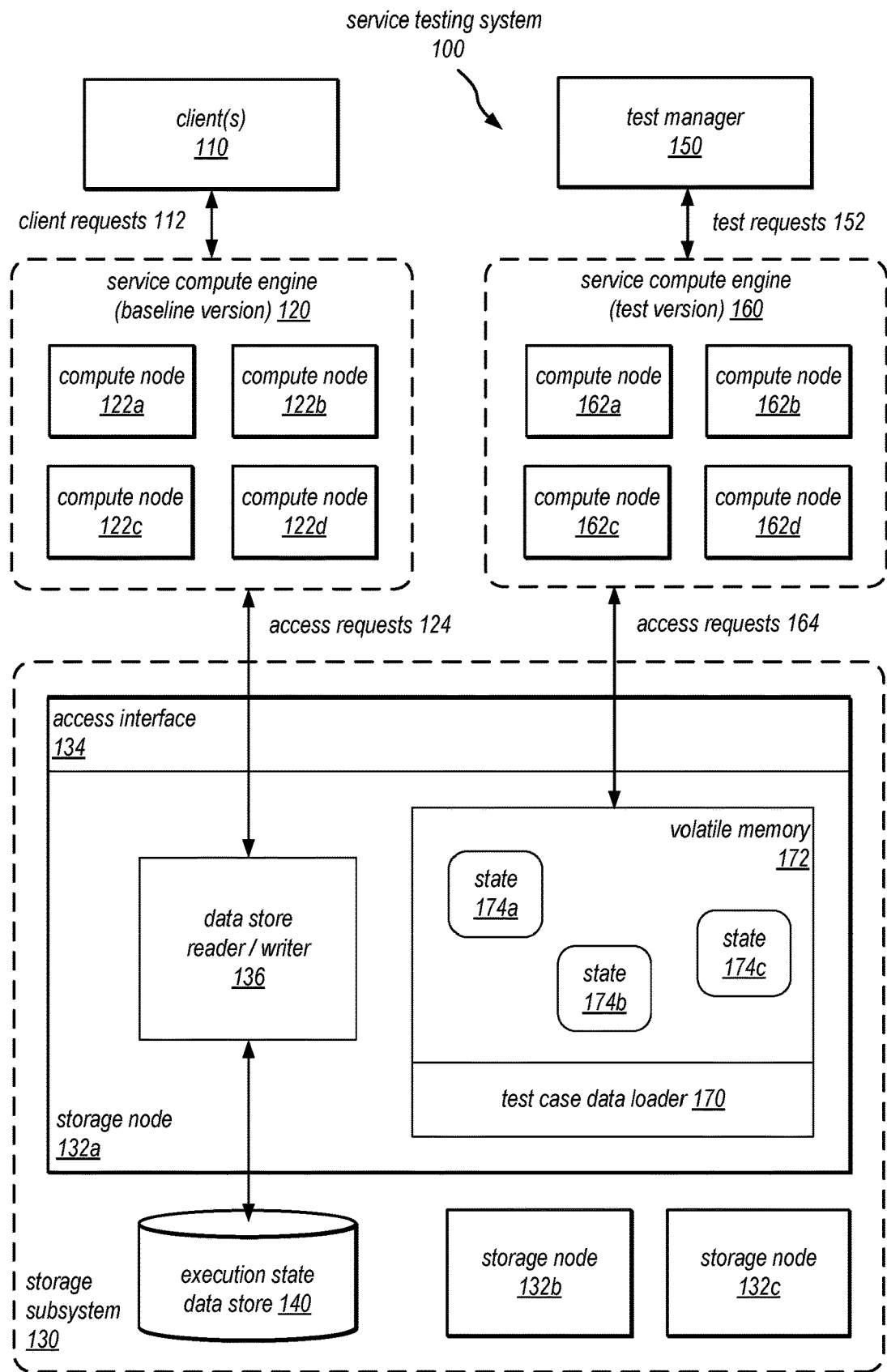
FIG. 1 is a block diagram illustrating an example service testing system that enables consistent replay of stateful requests during testing of a service, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of a service testing system are disclosed herein to provide consistent replay of stateful requests on a service compute engine whose output depends on the service's execution state prior to the requests.

Replay testing is an important tool used to verify many types of software, including software that implement cloud-based services. For example, replay testing can be used to perform regression testing of applications, where actual requests submitted to a production version of the application are captured and then replayed against a test version of the application. The results or responses from the two executions are compared to determine if the test version of the application has regressed in undesired ways.

While it is relatively straightforward to perform replay testing on stateless services that always return the same response for the same request, replaying requests on stateful services presents a number of challenges. For stateful services, the execution state of the service is needed to correctly replay a request. For example, if the service is idempotent for a particular request, the handling behavior for the request will be different depending whether the request has been seen before. Moreover, a desired execution state for service may not always be available, as the state may have been overwritten in the production database. Additionally, replay testing using the production data would impact live execution state data stored in the production database, causing undesired changes or inefficiencies in the behavior of the production version of the service. Maintaining a full-scale test database for testing purposes is costly, and worse, a single test database may not be scalable to handle large numbers of test runs that rely on conflicting execution state data.

To address these and other problems in state-of-the-art testing systems, these disclosures describe a service testing system for stateful services, which can correctly and consistently replay stateful requests based on previously captured request sequences.

In some embodiments, the service testing system implements a test version of a compute engine that executes stateful service requests and a storage subsystem that provides mocked execution states during the execution of stateful requests. When a stateful request is received during testing, the storage subsystem automatically creates an in-memory test copy of an execution state to support execution of the request, and makes the test copy available to the compute engine. Because the compute engine only accesses the in-memory test copy of the execution state data, production execution state data is not impacted. In some embodiments, the mocked execution state is provided to the compute engine in a completely transparent manner (e.g. via the normal access interface provided by the storage subsystem), so that the compute engine is not aware that the execution state is being mocked. In some embodiments, the storage subsystem may create a separate instance of execution state (e.g. in a separate memory section) for each individual test run. In this manner, different concurrent test runs using the same initial execution state will not interfere with one another during their executions.

In some embodiments, the storage subsystem may be configured to return the mocked execution state (which may be modified by one or more test requests) to a test client (e.g. a test manager or the compute engine). The test client may then save the execution state outside of the storage subsystem and use the execute state to later prime the storage subsystem for another test run. In some embodiments, the storage subsystem may be implemented using a pool of storage nodes, and the described mechanism may be used to copy an execution state from one storage node to another. In some embodiments, this mechanism may be used to implement testing of services that operate over different versions of compute engines or storage nodes. Additionally, a saved execution state will allow testers to begin a test run from the middle of the recorded request sequence, without executing requests prior to the saved execution state. In this manner, testers will be able to precisely reproduce the execution state at a particular point during the request sequence to easily focus on that point in the sequence.

In some embodiments, when the compute engine is handling a test request, it may invoke an external resource that is stateful. The stateful external resource may maintain its own state information that is not readily reproduceable by the service testing system. Examples of such external resource may include external databases or other services or systems. These stateful external resources present a problem for testing systems that rely on the state data to produce deterministic test results. For example, regression test systems may not be able to easily compare logged execution data generated by a test run with the baseline execution data if the logged data depends on responses from a stateful external resource. To solve this problem, in some embodiments, the service testing system is configured to compare only the input data sent to the stateful external resource, and not the output data received from the invocation. Comparing the inputs is sufficient for most regression testing purposes, since it can generally be assumed for testing purposes that the external resource has not changed. In some embodiments, the service testing system may spoof the output produced by the external resource by providing pre-recorded output from the external resource back to the compute engine in a transparent manner.

In some embodiments, the baseline version of the compute engine is configured to generate a non-repeatable parameter during the handling of requests. Examples of such non-repeatable parameters may include randomly generated values, sequence numbers, unique identifiers, time-based values, etc. These non-repeatable parameters again present a problem for testing systems because they cannot be consistently reproduced during testing. Accordingly, embodiments of service testing system herein provide a mechanism to stop the compute engine from generating such non-repeatable parameters during testing, and instead use a pre-recorded value of the parameter provided as input to the compute engine. In some embodiments, the pre-recorded value may be provided via an unexposed testing interface of the compute engine that is not available to clients in the production environment. In some embodiments, the logic to accept and use the non-repeatable parameter value as input is implemented in the compute engine, but without modifying other behavior of the compute engine subject to testing. In this manner, the pre-recorded value of the non-repeatable parameter may be injected into the compute engine during testing, making it much easier to compare execution logs for regression testing purposes.

The features discussed in this disclosure implement improvements to the functioning of a service testing system that, inter alia, enables replay of requests on a stateful service to generate consistent execution logs. As will be apparent to those skilled in the art, the disclosed improvements to the functioning of other testing systems of the state of the art provide a number of technical advantages including increased scalability, more efficient use of computing resources, and enhanced ease of use. These and other features and benefits of the disclosed system are discussed in further detail in connection with the figures.

FIG. 1 is a block diagram illustrating an example service testing system that enables consistent replay of stateful requests during testing of a service, according to some embodiments.

As shown, the figure depicts a service testing system 100 on the right-hand side, which implements a test version of a service compute engine 160 that executes stateful requests using execution states 174a-c provided by a storage subsystem 130. The left-hand side of the figure depicts a baseline version of the compute engine 120, which also uses the storage subsystem 130 in the depicted embodiment. In some embodiments, the baseline version of the compute engine may produce execution data or results that can be compared to execution data or results produced by the test version of the compute engine. The baseline version may be a production version of the compute engine, or another test version of the compute engine also under testing by the service testing system. As shown, in some embodiments, the storage subsystem 130 may be implemented using a pool of storage nodes (e.g. storage node 132a-c), which may be automatically provisioned or deprovisioned by a service provider based on service demand or other system conditions. In some embodiments, the storage nodes may be implemented as virtual machine instances hosted on physical servers operated by the service provider. In some embodiments, incoming access requests to the storage subsystem (e.g. access requests 124 and 164) may be assigned to different storage nodes by a load balancer. In some cases, access requests for both production service requests and test service requests may be handled by the same set of storage nodes.

As shown on the left-hand side, the baseline version of the compute engine 120 is used to handle client requests 112 from clients 110, which may be production clients of the service. The client requests 112 are stateful requests whose behavior or output depends on an execution state of the service prior to the request. As one example, the compute engine 120 may provide an item ordering and shipping service that is accessible to clients via a web-based interface. The baseline version of the compute engine may be implemented using a pool of compute engines 122a-d, which may be virtual machines provisioned and managed by the service provider, like the storage nodes 132a-c.

As shown, the compute engine 120 will issue access requests 124 to the storage subsystem 130 to update the execution state based on a sequence of client requests. The execution state may include state information that is maintained during the lifecycle of the request sequence. For example, in an item ordering and shipping service, the state information may include the details about an item order that is constructed by the sequence of client requests, including the item being order, packaging details, payment and shipping information, etc.

As shown, in some embodiments, the execution state data generated by the baseline version of the compute engine 120 may be stored in an execution state data store 140. In some embodiments, this data store may be a database system provided by the service provider. In some embodiments, the data store 140 may be accessible to all storage nodes 132 in the storage subsystem. The execution state data may be stored only temporarily (e.g. for the duration of a request sequence or user session), or maintained indefinitely (e.g. as a permanent record of processed transactions).

As shown, the storage node 132 may provide to the compute engine 120 an access interface 134 for the access requests 124. The access requests 124 may be specified in accordance with the access interface 134, which may be an application programming interface (API) or call interface, and allow the compute engine 120 to read and write particular elements of the execution state. In some embodiments, as shown, the storage node 132 may implement a data store reader/writer component 136, which is tasked with interfacing with the execution state data store 140 to carry out the access requests 124 issued by the compute engine 120. For example, the data store reader/writer 136 may translate the high-level instructions specified by the access requests 124 into database read/write commands (e.g. in the form of a database API or language such as Structured Query Language (SQL)). In some embodiments, the data store 140 is a key-value data store, and the access interface 134 allows for reading and writing of the key-value data store.

As shown, the service testing system 100 may implement a test version of the compute engine 160, which is being tested. For example, the test version 160 may implement a changing version of the compute engine that is under develop to add new features or modify existing features. To test the compute engine 160, a test manager 150 may be implemented to issue test requests 152 to the compute engine. Like client requests 112, the test requests are also stateful requests. The test requests 152 may be obtained from test case data that is gathered or compiled from logs of previous requests sent to the baseline version of the compute engine 120. In regression testing, the execution data generated by the two versions of the compute engine may be compared to detect any differences between the behavior of the two versions.

As shown, the test version of the compute engine 160 may be implemented as a group of computing nodes 162a-d, similar to the baseline version of the compute engine 120. As a result of the test requests 152 from the test manager, the compute engine 160 may issue access requests 164 to the storage subsystem 130. As shown, the access requests 164 may be issued to the same access interface 134 on the storage nodes that is used by the baseline version of the compute engine 120. In this manner, the test version of the compute engine 160 does not have to implement any specialized code to access the execution state data provided by the storage node. Compute engine 160 can simply execute the request as it would in the production environment.

As shown, the storage subsystem 130 or storage node 132 will treat the access requests 164 differently from the access requests 124. In some embodiments, the storage node 132 may recognized that an access request is associated with a test run, and select different ways of providing the execution state accordingly. For example, in some embodiments, the test manager 150 may submit a request-specific configuration parameter to the storage subsystem 130, or set an environmental variable that is checked by the storage subsystem 130. The storage node will then use such settings to determine how to provide the execution state data.

As shown, in some embodiments, if the access request 164 is determined to be associated with a test, the storage node 132 will load a mock copy of the execution state 174 into its volatile memory 172. All requests in a single test run will read or modify that in-memory copy of the execution state 174. In some embodiments, the in-memory copy of the execution state 174 will be loaded into the process memory of a storage node process that is responsible for handling incoming execution state access requests. In some embodiments, the execution state data may be stored locally on the storage nodes as test case data, and a test case data loader component 170 may be configured to load the execution states into its volatile memory. In some embodiments, one instance of the execution state will be loaded for each test run. In this manner, different test runs (e.g. concurrently executing test runs) that access the same execution state data will not conflict with one another. Moreover, because the execution states 174 are stored and managed separately from production execution data in the data store 140, replay of requests during testing will have no impact on the live execution state data used by the baseline version of the compute engine 120. In some embodiments, after a test run is finished, the execution states 174 may be removed from the volatile memory 172 so that memory usage on the storage node may be kept low. The removal of execution states from the volatile memory may be performed immediately according to a directive from the test manager 150, or garbage collected at a later time based on indications that the test run has terminated.

Figure 2:
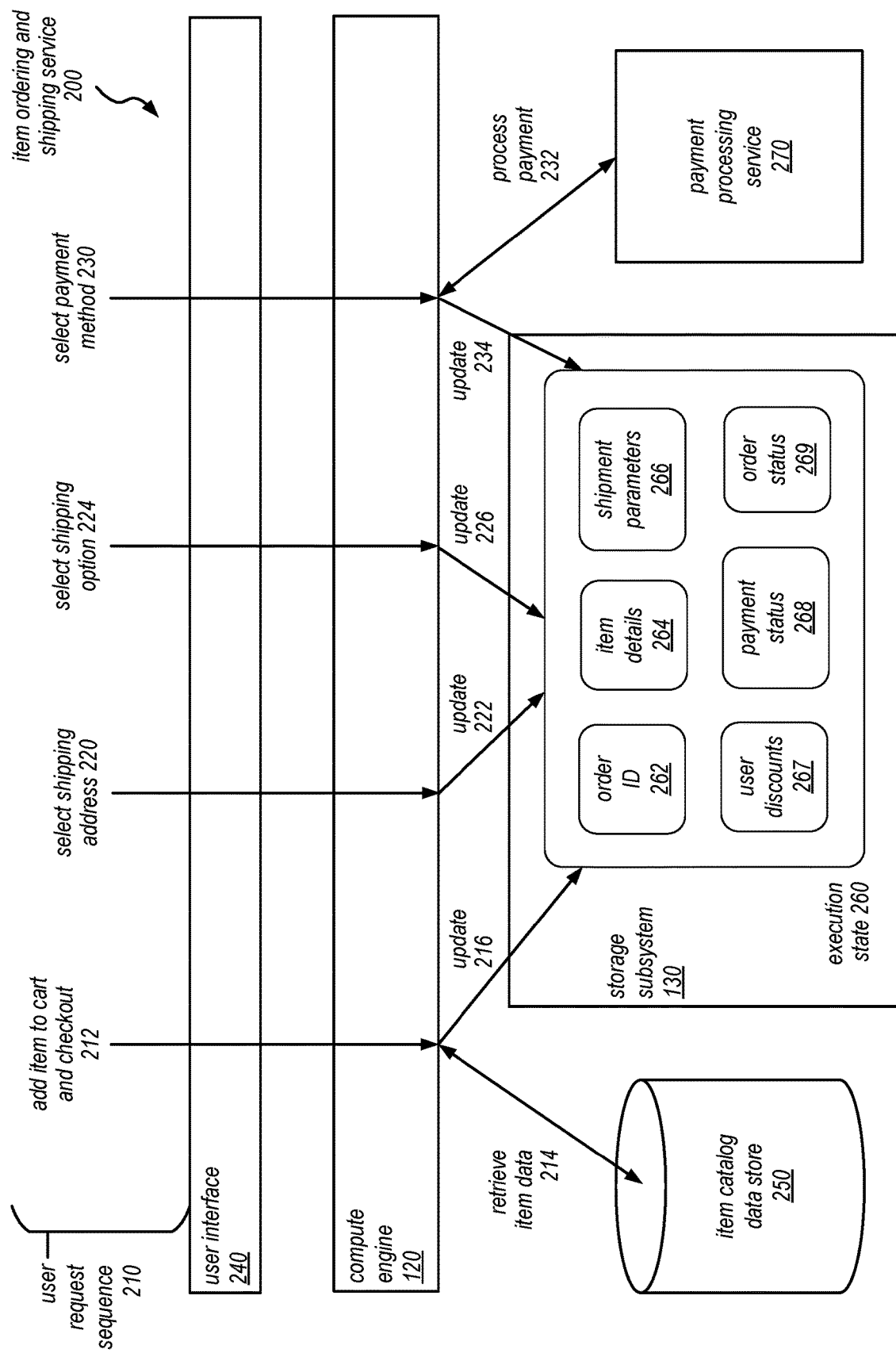
FIG. 2 illustrates an item ordering and shipping service that can be tested using a service testing system that is configured to replay stateful requests, according to some embodiments.

FIG. 2 illustrates an item ordering and shipping service that can be tested using a service testing system that is configured to replay stateful requests, according to some embodiments. The depicted service 200 is one example of a stateful service that can be replayed using an embodiment of the service testing system 100 of FIG. 1. However, as will be understood by those skilled in the art, the inventive techniques discussed in this disclosure may be used to perform replay testing on many other types of stateful services or software systems.

As shown in this example, the item ordering and shipping service 200 is configured to receive a sequence of user requests 210 to carry out an item order transaction. Such a service may be implemented by an e-commerce website to allow users to purchase items using a web browser. Accordingly, the user's machine that is running the web browser may represent the client 110 of FIG. 1. In general, service clients may encompass any type of client configurable to submit requests to the service. For example, a given client may include a suitable version of a web browser, or may include a plug-in module or other type of code module configured to execute as an extension to or within an execution environment provided by a web browser. Alternatively, a client may encompass an application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data.

The clients may convey network-based services requests to the service via one or more networks. In various embodiments, the network(s) may encompass any suitable combination of networking hardware and protocols necessary to establish network-based communications between clients and service. For example, a network may generally encompass the various telecommunications networks and service providers that collectively implement the Internet. A network may also include private networks such as local area networks (LANs) or wide area networks (WANs) as well as public or private wireless networks. For example, both a client and the service may be respectively provisioned within enterprises having their own internal networks. In such embodiments, the network may include the hardware (e.g., modems, routers, switches, load balancers, proxy servers, etc.) and software (e.g., protocol stacks, accounting software, firewall/security software, etc.) necessary to establish a networking link between the client and the Internet as well as between the Internet and the service. In some embodiments, clients may communicate with the service using a private network rather than the public Internet.

In some embodiments, the service 200 is implemented by a cloud-based service provider network, which may provide computing resources via one or more computing infrastructure services. The service provider network may be operated by an entity to provide infrastructures services such as various types of cloud-based computing or storage services, as well as custom services such as depicted service 200. The service provider network may include numerous data centers hosting various resource pools, such as collections of physical and/or virtualized computer servers, storage devices, networking equipment and the like, needed to implement and distribute the infrastructure and services offered by the service provider network. In some embodiments, service provider network may provide computing resources in units called "instances," such as virtual compute instances. For example, the compute engine nodes 122 and 162 or storage nodes 132 discussed in connection with FIG. 1 may be implemented as virtual machines.

Virtual compute instances are one example of virtual computing resources. The virtual computing resources may be hosted on a virtualization host. A virtualization host may be one or more physical computing devices. The physical computing devices are an example of physical computing resources. A virtualization host may include a virtualization management module capable of instantiating and managing a number of different client-accessible virtual computing resources. The virtualization management module may include, for example, a hypervisor and an administrative instance of an operating system, which may be termed a "domain-zero" or "dom0" operating system in some implementations. The dom0 operating system may not be accessible by clients on whose behalf the virtual computing resources are run. The dom0 operating system may be responsible for various administrative or control-plane operations of the service provider, including for example capturing usage and performance metrics data from the virtual computing resources and the physical computing resources.

As shown in this example, the item ordering and shipping service 200 receives the sequence of user requests 210 via a user interface 240. The user interface 240 may be a web-based interfaces presented on a web browser. The various requests from the user 212, 220, 224, and 230 may be specified by the user via various user interface controls implemented by the web browser. The service 200 receives the requests (e.g. as HTTP requests), and causes the compute engine 120 to carry out the user requests. As shown, each user request in this example may update an execution state 260 maintained by the storage subsystem 130. The execution state 260 affects the execution behavior and output of the requests in the sequence 210. The maintenance of such state information across these requests makes the requests stateful requests.

In this example, the user issues a first request 212 to add an item to a shopping cart and initiate the checkout process. As a result, the compute engine retrieves 214 the item data from an item catalog data store 250, and updates 216 the execution state 260 (e.g., to indicate item details 264 associated with the item). The compute engine may also determine other information associated with the item, such as any user discounts 267. In some embodiments, an order ID may be generated as part of the execution state. In some embodiments, the order ID may be a non-repeatable parameter such as a random value or an increasing sequence number, which will not be repeated for requests specifying the same input values.

The user next issues a request 220 to specify the shipping address, and a further request 224 to select a shipping option. These requests cause the compute engine to update 222, 224 the execution state 260, for example, to modify shipping parameters 266 maintained as part of the execution state.

Finally, in this example, the user issues a request 230 to select a payment method. This request may involve the user providing a credit card number and verification information. As a result, the compute engine will interface with a payment processing service 270 to process 232 the payment. If the processing of the payment is successful, the compute engine will again update the execution state to update the payment status 268 and possibly initialize the order status 269. In some embodiments, the execution state 260 will then be persisted for a next system in the processing chain (e.g. a shipment tracking system), which will further update the execution state data.

Figure 3A:
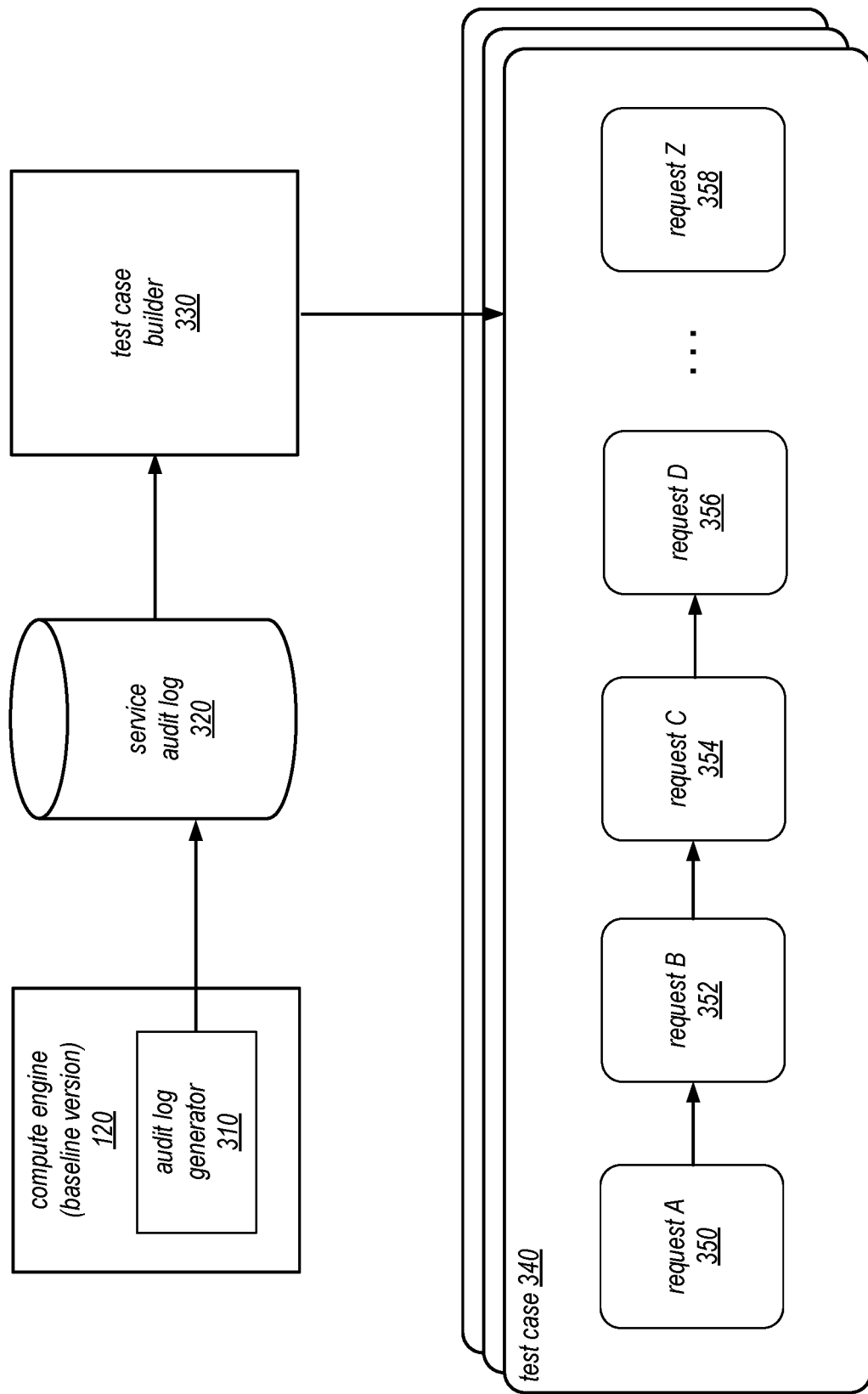
FIGS. 3A and 3B illustrate example collections of production data to build test cases for the service testing system, according to some embodiments.
Figure 3B:
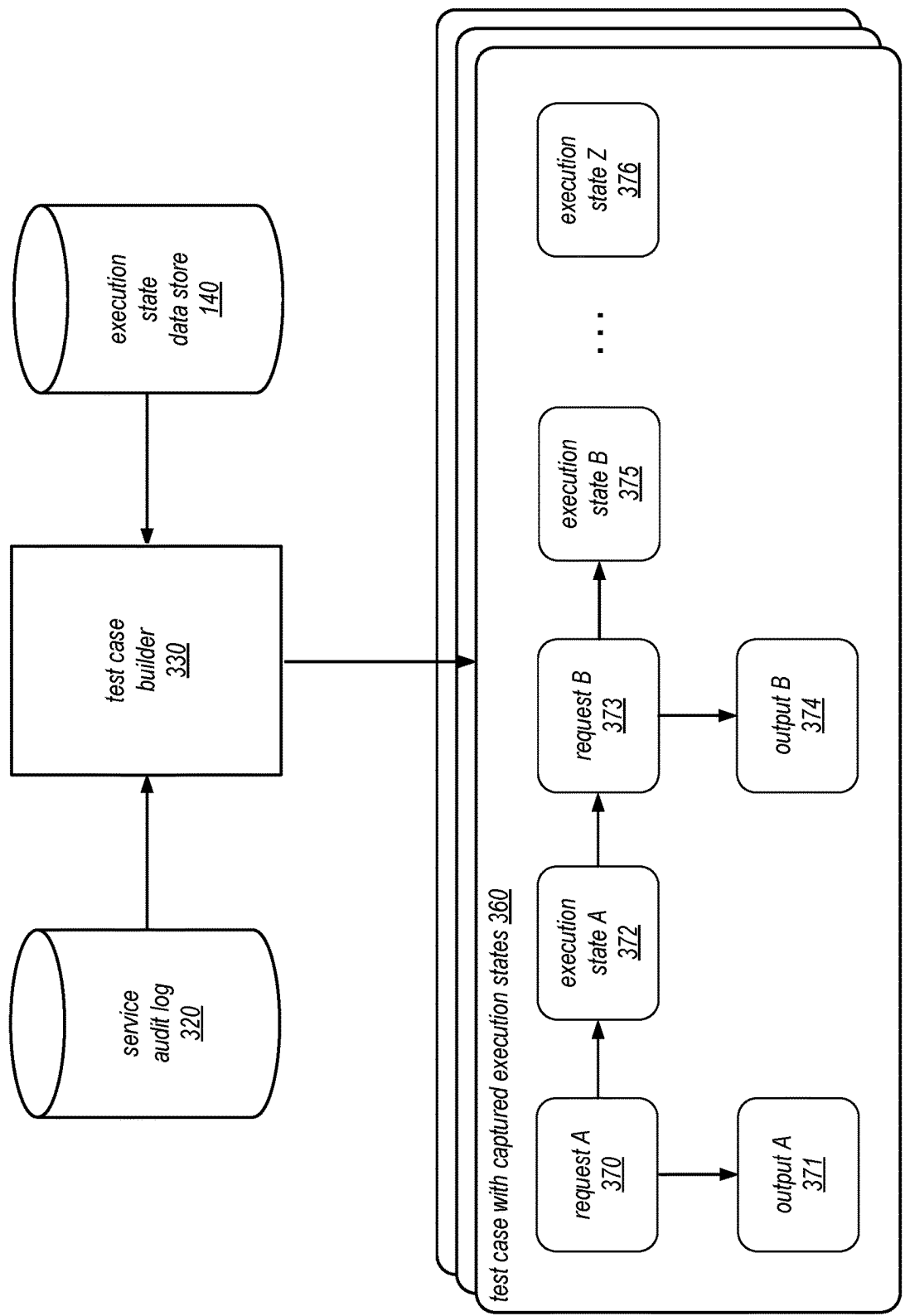

FIGS. 3A and 3B illustrate example collections of production data to build test cases for the service testing system, according to some embodiments.

In some embodiments, the mock copy of the execution state provided by storage node discussed in connection with FIG. 1 is loaded from test case data. Depending on the embodiment, the test case data such as test case 340 in FIG. 3A or test case 360 in FIG. 3B may be stored in a variety of forms.

As shown in FIG. 3A, test case data may be gathered or compiled from actual execution data generated by the baseline version of the compute engine 120 during the execution of production requests. In some embodiments, the captured execution data may be output by an audit log generator 310, and stored in an audit log repository 320. In some embodiments, the audit log generator may be implemented as part of the compute engine itself. In some embodiments, the audit log may be generated by one or more components external to the compute engine, for example, by an external logger that monitors the compute engine for particular events or conditions. The audit log may include data such as input parameters of incoming requests, output parameters of responses, intermediate values of execution variables, performance metrics, among other types of execution data.

As shown in this example, a test case builder 330 is used to generate test case data (including test case 340) from the audit logs. In some embodiments, the test case builder may be provided as part of the service testing system 100. The test case builder may be a user interactive subsystem that allows testers to browse the audit log and select particular sequences for building test cases. In some embodiments, the test case builder may automatically scan the audit log and select appropriate request sequences to use as test runs. For example, the test case builder may search for request sequences that are substantially complete (e.g. not missing any intermediate requests, responses, or execution states). As another example, the test case builder may automatically flag request sequences that caused an error or allow users to search for particular types of request sequences. Once an appropriate request sequence is found in the audit log, the test case builder may provide tools to allow the user to convert the logged request sequence into test case data. In some embodiments, the test case builder may also allow users to update configuration settings associated with a test case, which will control how a test case will be executed by the service testing system.

As shown, the test case builder will perform or facilitate a process to produce many test cases, including example test case 340. In this example, the test case data 340 specifies the sequence of requests issued to the baseline version of the compute engine, including requests A to Z (requests 350, 352, 354, 356, and 358). In some embodiments, the test case data 340 may include all requests and sub-requests issued among components within and external the service, as well as the requests' input parameters. These recorded requests and input information will be used to replay the sequence of requests as a test in a test run.

FIG. 3B illustrates another type of a test case data 360 that includes captured execution states of the baseline version of the compute engine 120. As shown in this example, the test case data 360 includes the intermediate execution states (e.g. states A 372 and B 375) that are produced as a result of the requests (e.g. request A 370 and B 375). In some embodiments, the test case builder may recreate past execution states from execution state data store 140. The data store 140 may maintain a historical record of execution states. Alternatively, the test case builder may be able to reconstruct previous execution states based on state changes indicated in the audit log. Additionally, as shown, the output of the requests (e.g. output A 371 and B 374) may also be included in the test case data. The intermediate state and output of the requests can be used to compare to intermediate states and outputs produced by a test version of the compute engine during testing. In some embodiments, the test case builder 330 may be configured to create both types test case data 340 and 360. If a test case data includes intermediate state data or output data in the test case, the service testing system will be configured to use such data when examining the execution log generated by a test run.

Additionally, the test case data also includes the output of the requests (if any), including output A 351 and B 354. The outputs may include parameters of responses generated by the compute engine, and these values may be used to verify or validate output produced by the test version of the compute engine. Furthermore, the test cases data also includes execution states after the execution of each request in the sequence, including execution states A 352, B 355, and Z 356. The execution states may be used to during testing replay stateful requests that rely on these states. For example, these execution states may be loaded by the storage nodes 132 into volatile memory, as discussed in connection with FIG. 1. In some embodiments, each execution state may be stored as a full snapshot of the state data. In some embodiments, each stored execution state may only indicate changes from the previous execution state in the sequence. In some embodiments, the constructed test cases may be managed by the test manager 150, which may distribute execution states to the storage nodes as needed to prepare for execution of test runs.

Figure 4:
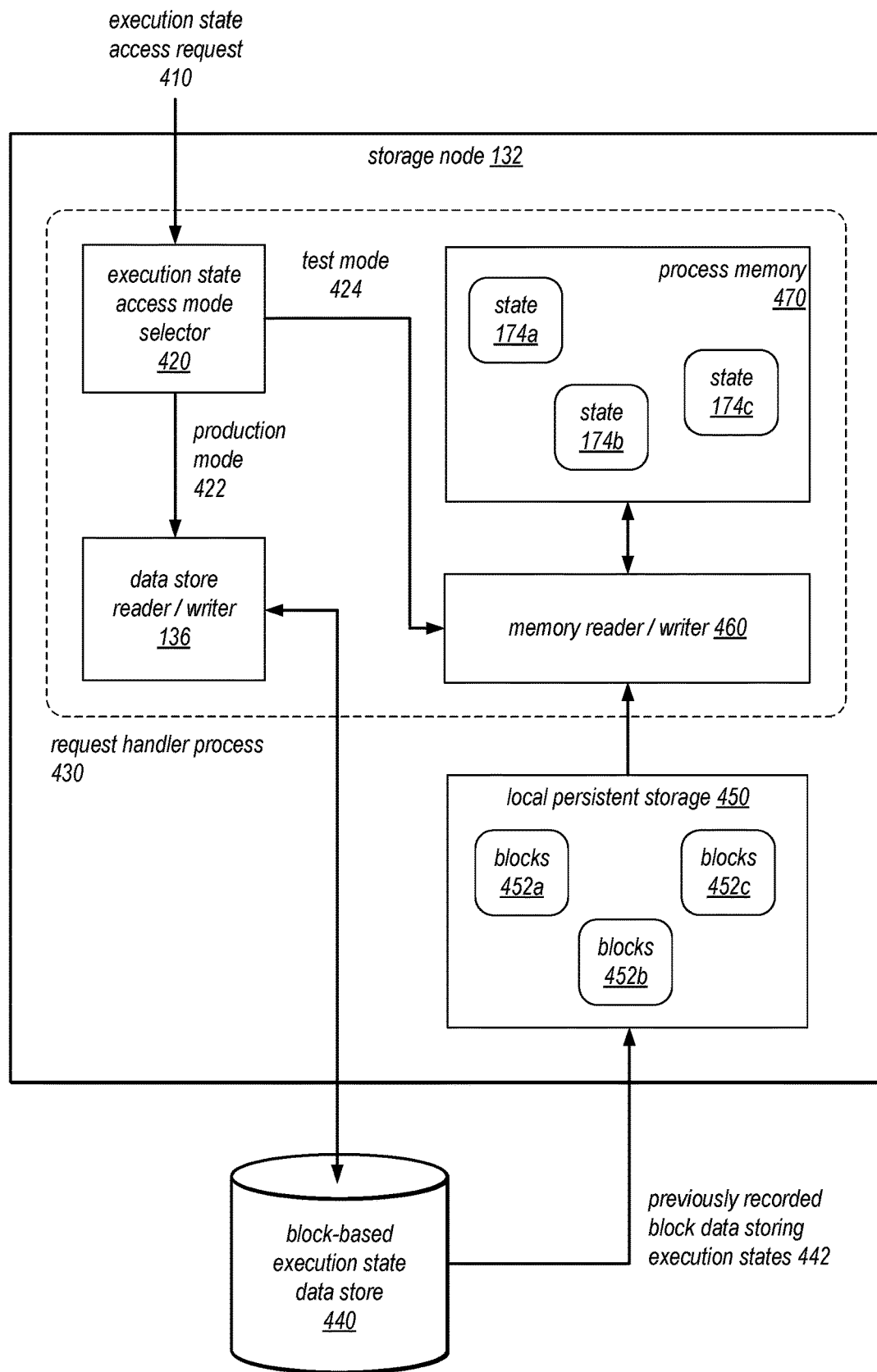
FIG. 4 illustrates a storage node used to implement the service testing system that replays stateful requests, according to some embodiments.

FIG. 4 illustrates a storage node used to implement the service testing system that replays stateful requests, according to some embodiments. This figure illustrates example details of the storage node(s) 132 discussed in connection with FIG. 1.

As shown in this example, the storage node 132 executes a request handler process 430, which may be configured to wait for and respond to any incoming execution state access requests 410. The execution state access requests may come from a production version of the compute engine, or a test version of the compute engine (e.g. compute engine 160 of FIG. 1).

As shown, the storage node 132 implements an execution state access mode selector 420. This selection component may be configured to determine whether an incoming request is a production request (e.g. one that comes from a production compute engine) or a test request (e.g. one that comes from a test compute engine). Depending on the determination of the mode selector 420, the request handler process will provide the execution state in different ways. As shown, if the request is associated with a production request, the selector will select a production mode 422 as the access mode. Under the production mode, the storage node will use the data store reader/writer 136, as discussed in connection with FIG. 1, to provide access to the requested execution state. In some embodiments, the data store storing the execution states may be a block-based data store 440, which represents one example of the execution state data store 140 of FIG. 1.

However, if it is determined that the request is associated with a test, the selector will provide access to the execution under the test mode 424. In some embodiments, the test mode may be enabled by the by the test manager 150 of FIG. 1. The enabling of the test mode on the storage node changes the behavior of the storage node, but does not change the functionality of the compute engine. Under the test mode, a memory reader/writer 460 will be used to read and write mocked copies of execution states resident in memory. In some embodiments, each request may be associated with a test run identifier, which will be used by the memory reader/writer component 460 to determine which execution state 174 is associated with each request. As shown in this example, the execution states 174a-c in this example are maintained in the process memory 470 of the request handler process 430. By maintaining execution state data in the process memory, access performance of the execution states is improved. In some embodiments, the memory reader/writer 136 may be used to implement the test case data loader 140 of FIG. 1, to load the execution state data up into volatile memory. In some embodiments, the loading may occur as a preparation step prior to the execution of the test run. In some embodiments, the loader may occur upon the first use of the execute state, when it is initially accessed by an incoming request.

As shown in this example, the storage node 132 stores execution states data in a local persistent storage 450. In embodiments where the execution state data is stored in a block-based data store 440, a saved execution state may include a subset of the blocks of the data store. In some embodiments, these blocks may be previously recorded 442 from the data store. In some embodiments, these blocks may simply be created in volatile memory for each test run, and used to emulate the data store during the test run. In some embodiments, only the initial execution state blocks for a test run are saved in full. Subsequent execution states in the same test run are recorded by storing changes to the blocks. As shown, these captured subsets of blocks 452a-c are stored in the local persistent storage 450 of the storage node as the execution states. In some embodiments, the execution states may be stored as files in a file system maintained by the storage node. In some embodiments, the execution states may be distributed to the storage nodes by the test manager. In some embodiments, the storage node 132 may not actually implement local persistence of the execution states, and will only create and modify the states in volatile memory.

Figure 5:
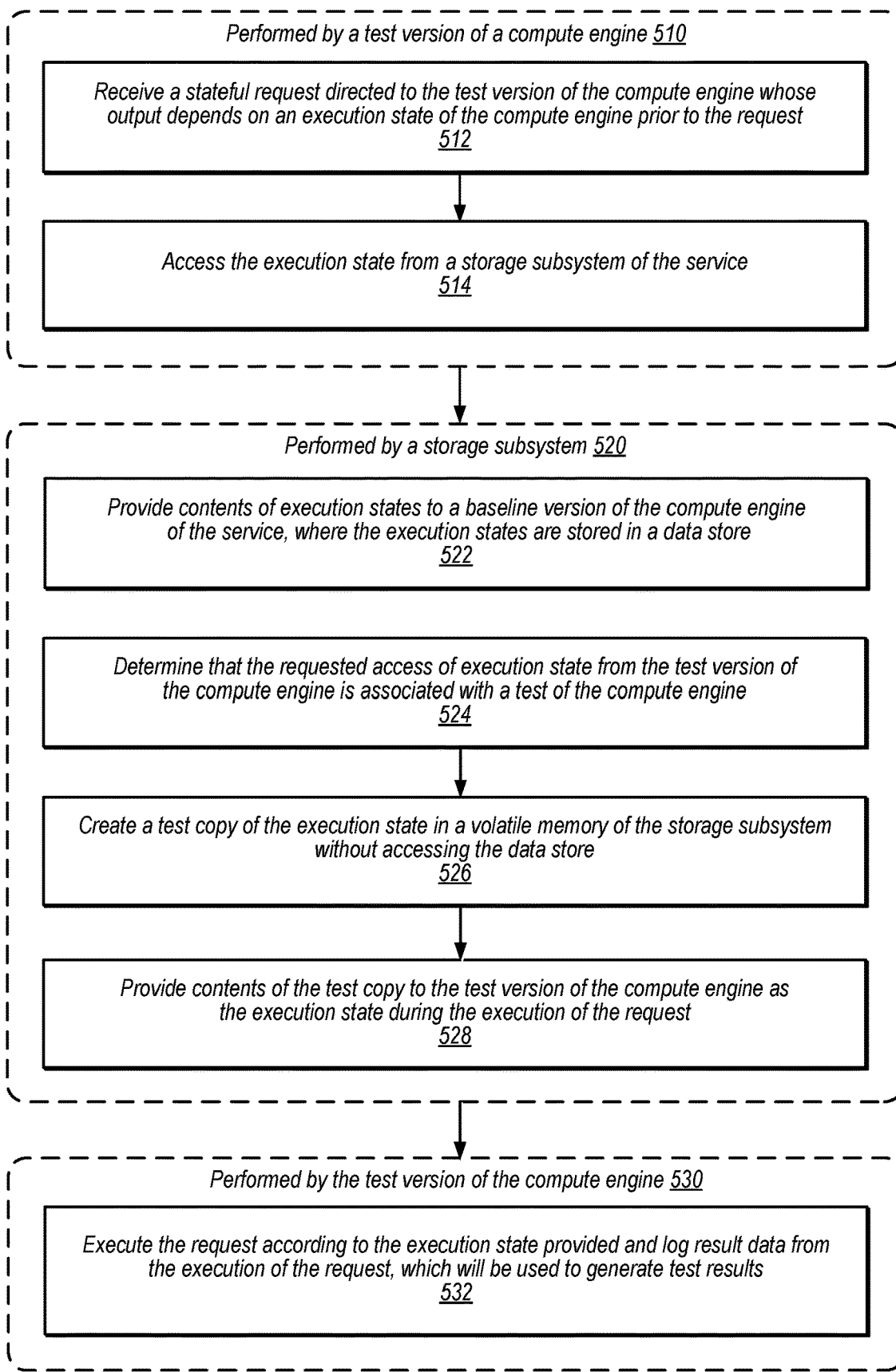
FIG. 5 is a flowchart diagram illustrating a process of replaying a stateful request in the service testing system, according to some embodiments.

FIG. 5 is a flowchart diagram illustrating a process of replaying a stateful request in the service testing system, according to some embodiments. The depicted process may be performed by components of the service testing system 100, as discussed in connection with FIG. 1.

As shown, operations 512 and 514 may be performed 510 by a test version of a compute engine, such as compute engine 160 of FIG. 1. At operation 512, a stateful request directed to the test version of the compute engine is received. The stateful request is a request whose output depends on the execute state of the compute engine prior to the request. For example, the stateful requests may be test requests 152 as discussed in connection with FIG. 1. In some embodiments, the execution state may be execution state 174 of FIG. 1.

At operation 514, the test version of the compute engine accesses the execution state from a storage subsystem of the service. The storage subsystem may be storage subsystem 130 of FIG. 1. In some embodiments, the compute engine may issue a state access request (e.g. access request 164 of FIG. 1). The access request may be issued according to an access interface (e.g. access interface 134 of FIG. 1), which may be the same access interface used by the production version of the compute engine. Accordingly, the manner that executions states are provided to the compute engine may be the same for the test compute engine as for the production compute engine.

As shown, operations 522, 524, 526, and 528 are performed 520 by the storage subsystem. At operation 522, the storage subsystem (e.g. a storage node 132 of the storage subsystem) provides contents of execution states to a baseline version of the compute engine of the service, where the execution states are stored in a data store. In some embodiments, the data store may be the execution data store 140 of FIG. 1, which is accessible by many storage nodes to store execution tests for service requests. In some embodiments, the data store may be a key-value data store. The storage node or storage subsystem may implement a data store reader/writer (e.g. reader/writer 136) that is configured to read and write the data store in response to execution state access requests from a production version of the compute engine.

As shown, operations 524, 526, and 528 may occur independently from operation 522 but on the same storage subsystem (or storage node). At operation 524, the storage subsystem determines that the requested access of the execution state is associated with a test of the compute engine. In some embodiments, the storage subsystem or storage node may be configured to recognize compute engines that are under testing. In some embodiments, another component such as the test manager 150 may provide a parameter to the storage subsystem to indicate that a given access request is part of a test. For example, the parameter may be provided as part of a control or test configuration parameter or command to the storage subsystem, or set as an environment variable visible to the storage subsystem. When a request is a test request, it will be treated differently by the storage subsystem from production requests.

At operation 526, in response to the determination that the state access request is associated with a test, the storage subsystem creates a test copy of the execution state in a volatile memory of the storage subsystem, without accessing the execution state data store used for production requests. Rather the test copy of the execution state will be created directly in a volatile memory of the storage subsystem or storage node, to support execution of the test request, which may read or write the execution state. In some embodiments, the test copy may be created from a previously captured execution state, which may have been generated by a baseline version of the compute engine. In some embodiments, the test copy of the execution state may be a mock copy of the state created in the request handler process memory (e.g. memory 470) of the storage node. In some embodiments, the execution state may be stored in the test case data associated with the request, as discussed in connection with FIG. 3B. In some embodiments, the execution state may include a subset of blocks of the execution state data store that are created in memory and used to emulate the execution state data store during the test run. In some embodiments, the blocks may be loaded into volatile memory by a component such as the test case data loader 170 of FIG. 1. Advantageously, the data store used to store execution states for production requests is not modified by the storage subsystem during testing, so that test runs of the service will not interfere with the storage of production execution states.

At operation 528, the contents of the test copy are provided to the test version of the compute engine. The contents may be provided to allow the compute engine to read and write the execution state using calls to the access interface (e.g the same access interface used by the production version of the compute engine). In some embodiments, the execution state may be maintained in the volatile memory of the storage subsystem through a sequence of multiple requests, which may each individually read and write the execution state. In some embodiments, when the sequence of requests is completed, the execution state may be removed from volatile memory and stored in persistent memory as part of the execution log. In some embodiments, the storage subsystem may provide the execution state so that each test run will have its own private copy of the execution state, so that their modification to the execution state will not interfere with other concurrently executing test runs.

As shown, operation 532 is performed 530 by the test version of the compute engine. At operation 532, the request is executed by the compute engine according to the execute state provided by the storage subsystem. Execution of the request may involve reading and/or writing the execution state. For example, in an item ordering and shipping service, execution of a stateful request may include reading and writing attributes of an item order data structure. The reading and writing may be performed by submitting appropriate calls to the access interface provided by the storage subsystem. Additionally, at operation 532,
results data from the execution of the request are logged. The logged execution data may later be used to generate test results, such as regression test results. In some embodiments, the logging may be performed by the test version of the compute engine itself, which may implement self-reporting functionality for debugging purposes, etc. In some embodiments, the logging may be performed by an external testing component, which may be configured to monitor the operation of the compute engine and record these operations and associated data.

Figure 6:
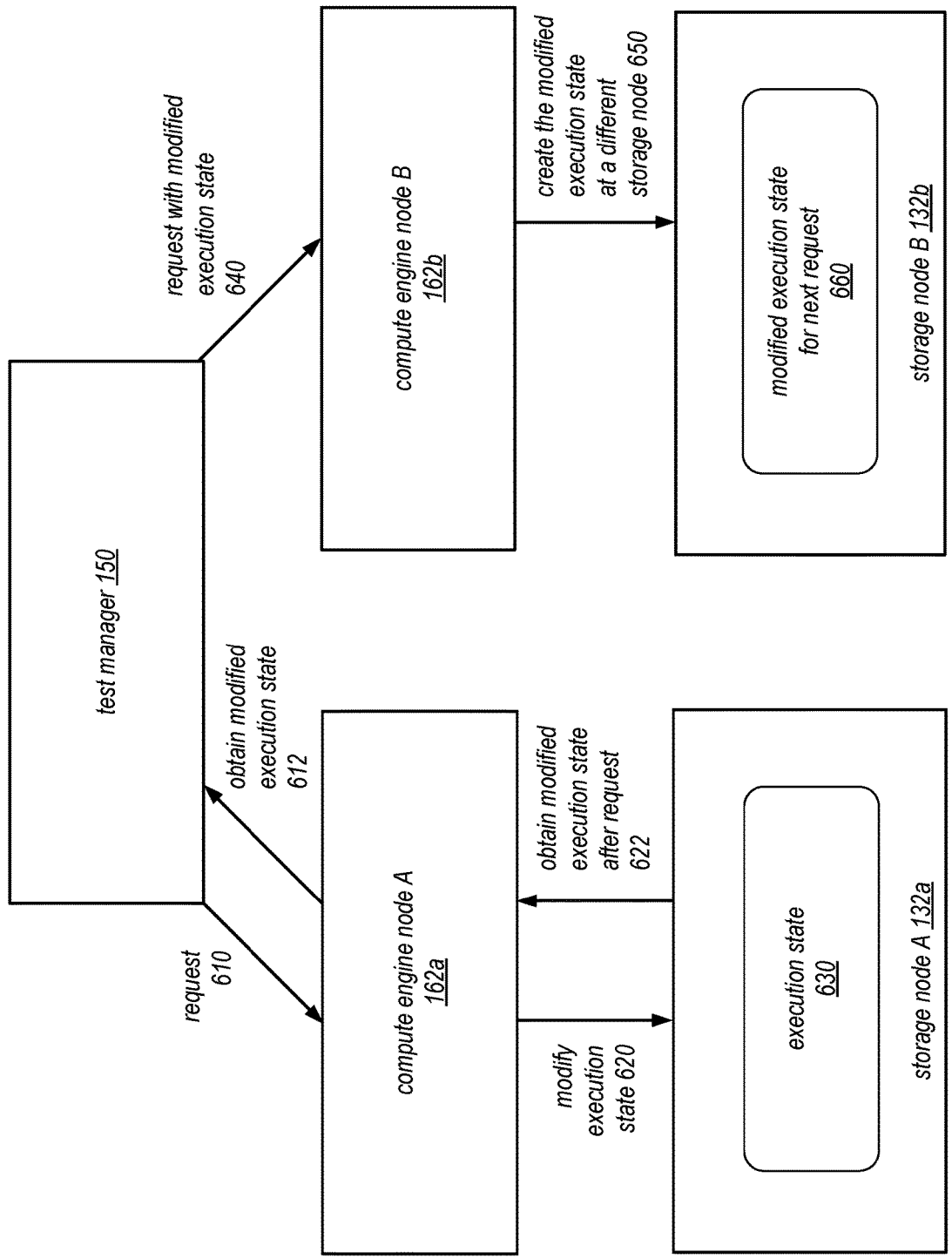
FIG. 6 is a block diagram illustrating components of a service testing system that implements a mechanism to copy an execution state of a service from one storage node to another, according to some embodiments.

FIG. 6 is a block diagram illustrating components of a service testing system that implements a mechanism to copy an execution state of a service from one storage node to another, according to some embodiments.

As shown, the figure depicts embodiments of the compute engine nodes 162a and 162b of FIG. 1 and the storage nodes 132a and 132b of FIG. 1. In this example, the test manager 150 issues a test request 610 to the compute engine node 162a, which causes the compute engine node to perform the request and modify 620 the execution state 630 provided by storage node A 132a. Storage node A may provide the execution state 630 in the manner discussed in connection with FIG. 1. In some embodiments, the test manager may interface with a load balancer, instead of directly with the compute engine nodes 162. The load balancer may be configured to select a compute engine node to handle the request based on runtime conditions (e.g. the current workloads) of the compute engine nodes. Accordingly, in some embodiments, the test manager cannot control which compute engine node is used for its requests 610.

As shown, after the execution state 630 has been modified as the result of execution of request 610, compute engine node A may obtain 622 the modified execution state from the storage node A. Depending on the embodiment, the execution state 630 may be obtained in a variety of ways. In some embodiments, the execution state may be returned by the storage node as a response to the access request from the compute engine node. In some embodiments, the compute engine node may make a separate request via a special testing interface to obtain the execution state held by the storage node. After compute engine node A has obtained the execution state 630, the compute engine may in turn return the execution state back to the test manager 150. In some embodiments, the execution state 630 may be returned along with the response to request 610. In some embodiments, the storage node A may have knowledge of the test manager 610 or have a side channel connection to the test manager. In this case, storage node A may directly return the execution state 630 to the test manager. In some embodiments, storage node A may not have direct knowledge of test manager 610. However, the test manager 610 may have knowledge that storage node A has the execution state 630. Test manager 610 may then query storage node A via a test API to retrieve the modified execution state 630.

As shown, once the test manager 610 has obtained the modified execution state 630, it may pass the modified execution state to another storage node B 132b. In some embodiments, the passing of the execution state may be performed by including the execution state within another request 640 to another compute ending node B 162b. Compute engine node B will then issue another call 650 to storage node B via the test API to instruct the storage node to create the execution state. Accordingly, storage node B will then instantiate another copy 660 of the modified execution state so that it can be used for the next stateful request 640 in the test run. In this manner, the service testing system can implement a way to move or copy execution states among multiple storage nodes, so that a test run can be executed over multiple storage nodes. This capability enables the service testing system to perform a number of different types of testing.

Figure 7:
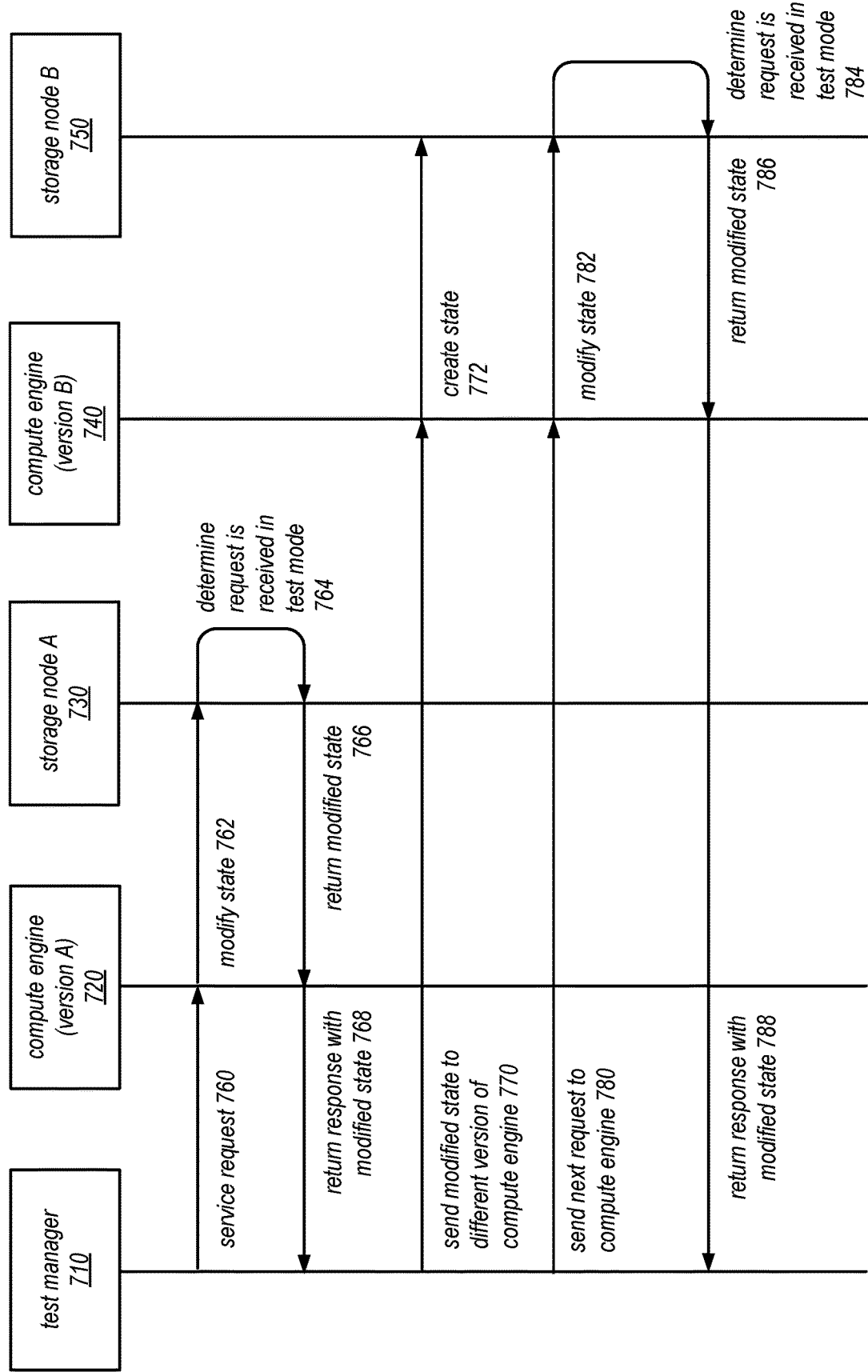
FIG. 7 is a system sequence diagram that illustrates a sequence of interactions among components of a service testing system to replay a request sequence using different versions of a compute engine, according to some embodiments.

FIG. 7 is a system sequence diagram that illustrates a sequence of interactions among components of a service testing system to replay a request sequence using different versions of a compute engine, according to some embodiments.

As shown, the sequence involves a test manager 710, two different versions of a compute engine 720 and 740, and two different storage nodes 730 and 750 that are attached to the two different versions of compute engines. The test manager 710 may be implemented in a similar manner as test manager 150 of FIG. 1 or test manager 610 of FIG. 6. The storage nodes A and B may also be implemented similarly as storage nodes 132 discussed in connection with FIG. 1.

As shown in this sequence, two different versions of compute engines (version A and version B) are being tested in a mixed-version configuration. Mixed version testing is useful in many situations where a fleet of compute engine or storage nodes include nodes that implement different versions of service software. For example, a service provider may elect to gradually switch over from one software version to the next, in order to avoid a complete failure of the service due to the new software. In some cases, multiple versions of service software may be maintained to accommodate legacy service clients that require certain service features that are deprecated in later versions. Mixed version testing allows the tester to replay a sequence of requests on nodes having different software versions, to reproduce events that occurred during actual execution in such systems.

At operation 760, the test manager 710 sends a service request as part of a test run to compute engine 720 having version A of the service software. As a result, compute engine 720 modifies 762 the execution state associated with the test run maintained by storage node A 730. Storage node A determines 764 that the modification or access request is received in a test mode, as discussed in connection with FIG. 4. In response to such a determination, compute engine A may create an in-memory mock copy of the execution state to provide to compute engine 720. Additionally, based on the determination that the request is associated with a test, storage node A may automatically return the modified execution state after the modification. In this example, the execution state is returned to the compute engine A, which may implement code to receive and return 768 the execution state to the test manager. In some embodiments, such code may be instrumentation code used for testing or auditing purposes, which may be enabled for by the test manager during the test run.

At operation 770, the test manager sends the modified execution state to a different version of the compute engine (version B 740). In some embodiments, the test manager may be responsible for orchestrating which compute engine nodes and which storage nodes will be used for each request in the test run. In some embodiments, the test manager may interface with a load balancer, but be able to specify to the load balancer (e.g. via a testing interface or the normal request interface) which version of the compute engine (e.g. version A or version B) should be used to execute the request. In some embodiments, the preparation of the execution state on storage nodes may be performed before the test run is initiated, as opposed to during the middle of the test run.

At operation 772, in response to receiving the modified execution state, version B of the compute engine 740 instructs storage node B 750 to create the execution state. In some embodiments, the instruction may be provided by invoking a special function of the storage node B provided through a testing interface. The compute engine may provide the execution state to storage node B as part of the invocation.

After storage node B has created the modified execution state, the next operations are performed in similar manner as compute engine (version A) 720 and storage node A 730. The test manager sends 780 a next request in the sequence to compute engine 740, which implements version B of the service software. In some embodiments, the sending of the execution state 770 and the sending of the next request 780 may be performed as a single communication from the test manager to the compute engine 740. As a result of executing the next request, compute engine 740 further modifies 782 the execution state, this time provided by the prepared storage node B. Storage node B may determine 784 that the next request is received in test mode, and provides the mock copy of the execution state to compute engine 740. After the modification, storage node B returns 786 the modified execution state back to compute engine 740, which in turn returns 788 the execution state back to the test manager. In this manner, the execution state may be copied from storage node to storage node for a single test run, to allow different types of compute engine nodes to be used during the test run.

Figure 8:
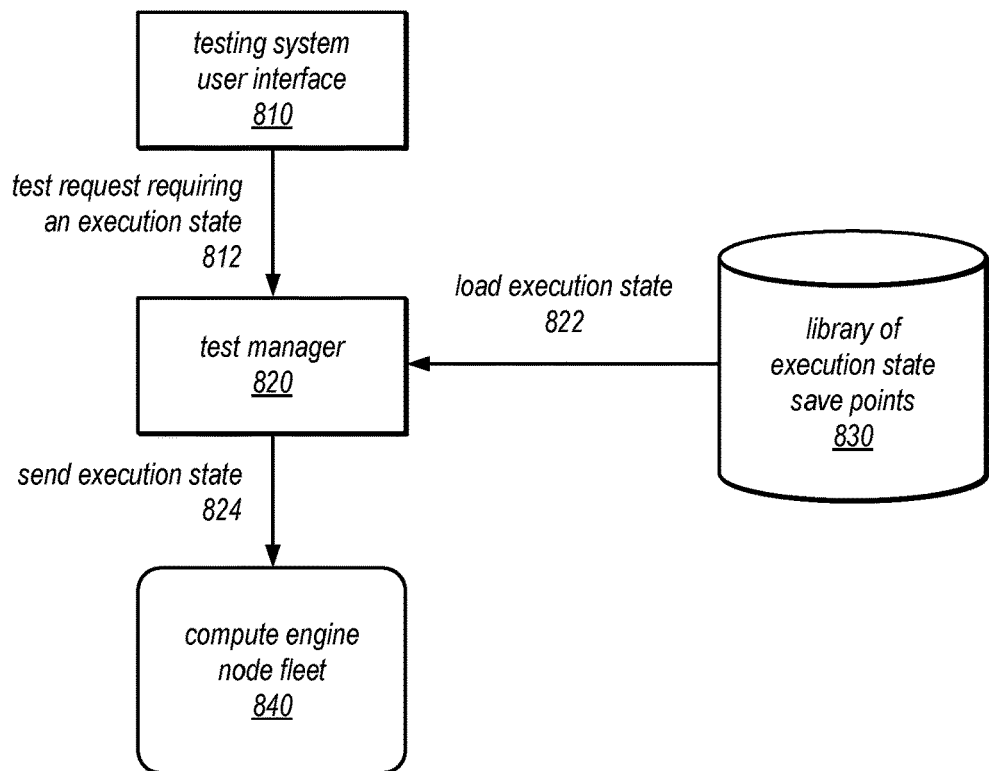
FIG. 8 illustrates a service testing system that stores and loads execution state save points to be used for service testing, according to some embodiments.

FIG. 8 illustrates a service testing system that stores and loads execution state save points to be used for service testing, according to some embodiments. In this figure, the test manager 820 may be test manager 150 of FIG. 1, and the compute engine node fleet 840 may be implemented by the compute engine 160 of FIG. 1.

In the depicted system, the test manager 820 is able to save (and then later load 822) execution states as save points in a library 830. These save points can be loaded as needed to reproduce an execution state on a storage node for testing purposes. This feature allows the user to initiate a test run from a particular point in the middle of a test run, without having to re-execute all previous requests in the test run that led up to that point.

As shown, the service testing system may implement a test system user interface 810, which may allow the tester to browse the library 830 and select an execution state to load into storage nodes via the compute engine node fleet 840. In some embodiments, the tester may select 812 a particular request in a test run to perform, and the test manager may automatically determine the execution state save point to be loaded. Once the appropriate execution state is retrieved from the library, the test manager sends 824 the execution state to one or more nodes in the compute engine node fleet, which will cause one or more storage nodes to instantiate the execution state. The test manager will then proceed to run the request 812 on a selected compute engine node, using the execution state.

Figure 9:
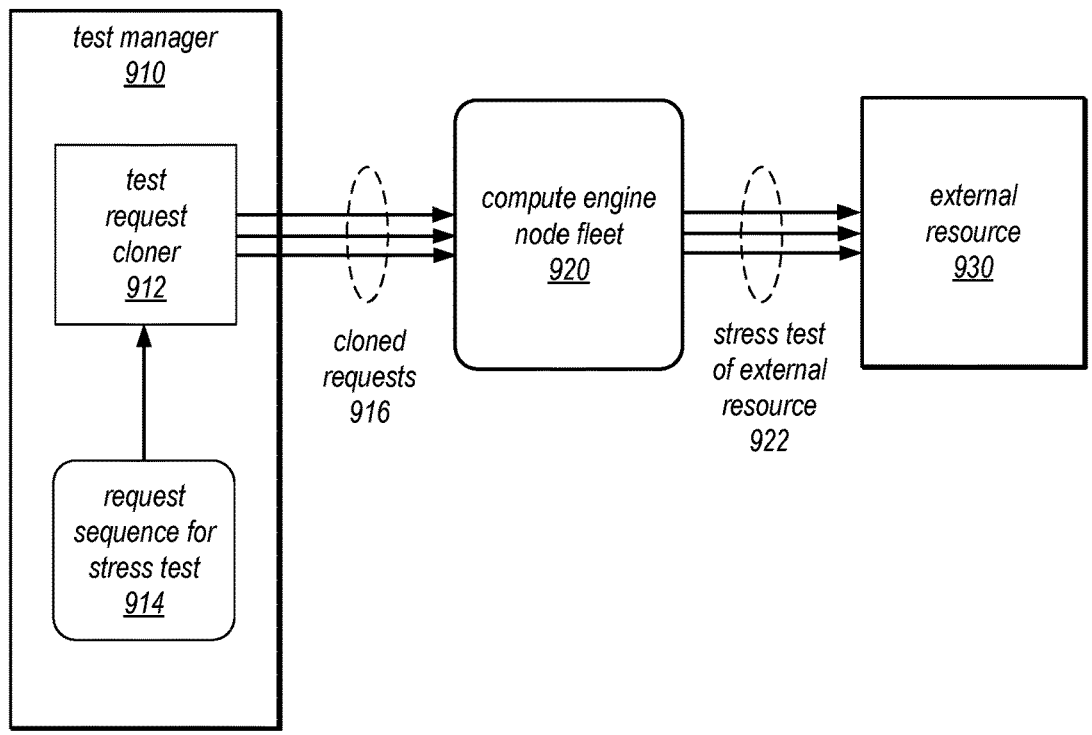
FIG. 9 illustrates a service testing system that uses a saved execution state to perform a stress test of an external resource, according to some embodiments.

FIG. 9 illustrates a service testing system that uses a saved execution state to perform a stress test of an external resource, according to some embodiments. In this figure, the test manager 910 may be test manager 150 of FIG. 1. The compute engine node fleet 920 may be implemented by the compute engine 160 of FIG. 1, and the external resource 940 may be implemented by a distinct system from the service being tested, such as data store 250 or service 270 of FIG. 2.

In the depicted example, the test manager 910 performs the stress test of the external resource 940 by cloning and issuing a large number of stateful request sequences as test runs, using a test request cloner component 912. The cloned requests 916 may be generated from a particular request sequence 914 used for the stress test. In some embodiments, the request cloner 912 may generate cloned request sequences with different unique identifiers (e.g. different transaction IDs), so that it appears to the service that there are many distinct request sequences. In some embodiments, the cloned test requests 916 may be issued at approximately the same time to the compute engine node fleet 920. In this way, the test requests will cause a large number of compute engine nodes to issue requests to the external resource 930 at approximately the same time, to stress test the external resource. In some embodiments, the cloned requests may be configured to cause a single data record, data item, component, or resource in the external resource to be accessed by a large number of access requests. In this manner, the depicted system allows the external system to be stress tested in a controlled manner. During the stress test, the test manager (or some other monitoring component in the service testing system) may capture performance data about the external resource, such as request throttle counts or latency metrics.

Figure 10:
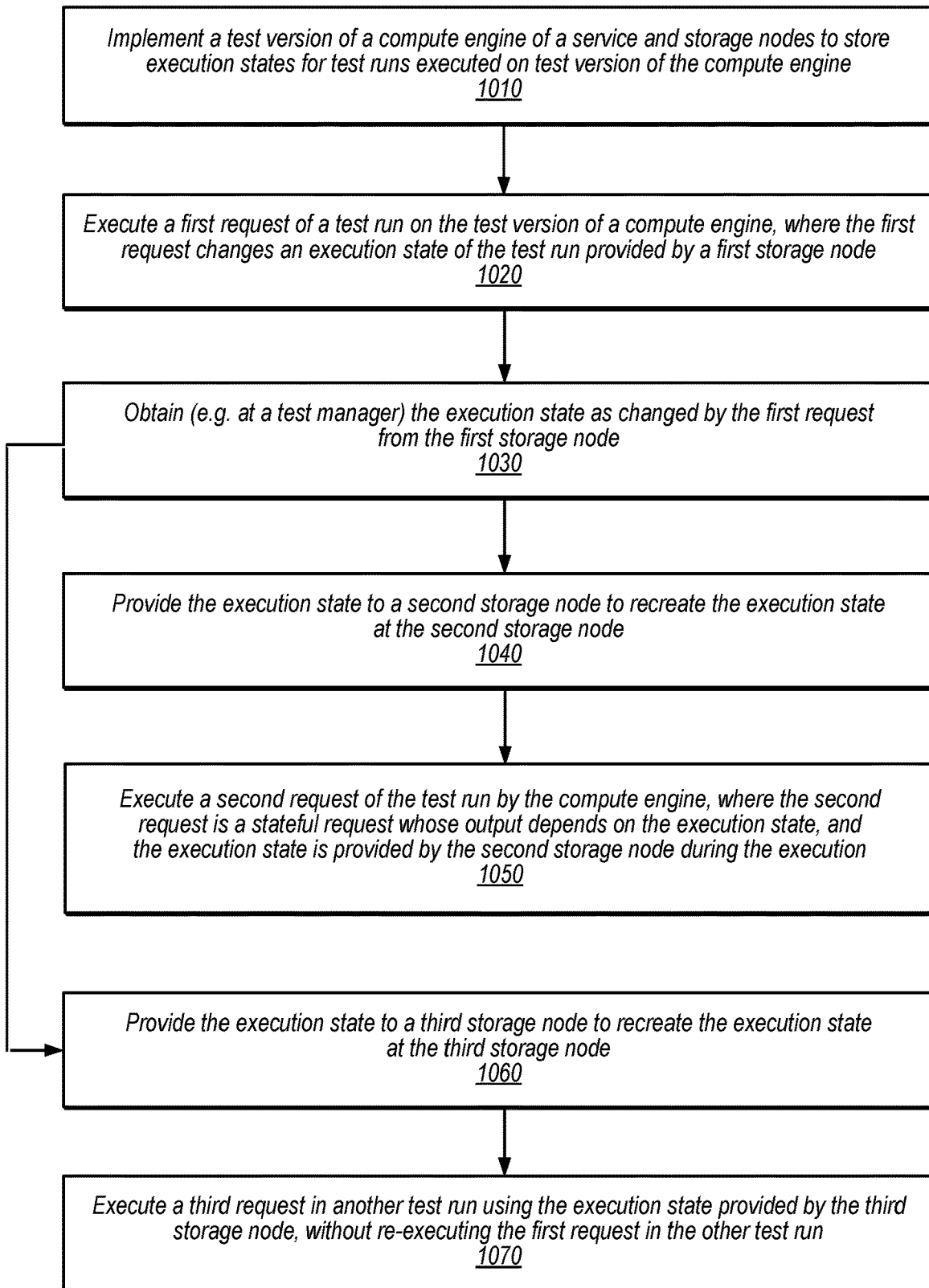
FIG. 10 is a flowchart diagram illustrating a process of copying an execution state among storage nodes for different testing purposes, according to some embodiments.

FIG. 10 is a flowchart diagram illustrating a process of copying an execution state among storage nodes for different testing purposes, according to some embodiments. The process shown in the figure may be performed by an embodiment of the service testing system 100 of FIG. 1, and in a manner similar to that discussed in FIG. 6 or FIG. 7.

At operation 1010, a service testing system implements a test version of a compute engine of a service, and storage nodes to store executions for test runs executed on the test version of the compute engine. The compute engines here may be implemented using compute engine nodes such as compute engine 122*a* as discussed in connection with FIG. 6, and the storage nodes may include the storage nodes 132*a* and 132*b*, as discussed in connection with FIG. 6.

At operation 1020, a first request of a test run is executed on the test version of the compute engine. The request may be a stateful request issued by the test manager, whose output depends on the execution state. In this example, the request changes the execution of the test run. The execution state is provided by a first storage node, which may allow the compute engine to modify the execution state via an access interface such as access interface 134 of FIG. 1.

At operation 1030, the test manager obtains the execution state as changed by the first request from the storage node. In some embodiments, the execution state may be returned to the test manager directly by the storage node, which may maintain a private connection or side channel to the test manager for testing purposes. In some embodiments, the execution state may be provided first to the compute engine, which in turn provides the execution state to the test manager. In some embodiments, the test manager may actively retrieve the execution state from the storage node or the compute engine, instead of receiving the execution state in a response.

At operation 1040, the execution state is provided to a second storage node to recreate the execution state at the second storage node. In some embodiments, the test manager may be configured to send the execution state to the second storage node, for example, via a testing interface or private connection with the second storage node. This operation will cause the second storage node to store the execution state (e.g. locally), so that it may be loaded for a next request in the test run.

At operation 1050, a second request of the test run is executed by the test version of the compute engine, where the second request is a stateful request whose output depends on the execution state, and where the execution state is provided by the second storage node during the execution. The second request may be a next request in the test run, and issued by the test manager. Because the second storage node was previously provided with execution state as modified by the first request, the second storage node may be used to continue the test run, taking over for the first storage node. As may be appreciated by those skilled in the art, the described process may be repeated to copy the execution state from one storage node to the next, to allow many different storage nodes to be used to execute a test run.

Operations 1060 and 1070 represent another sequence of operations that can be performed after the test manager obtains the execution state after the first request. At operation 1060, the execution state as modified by the first request is provided to a third storage node to recreate the execution state at the third storage node. Operation 1060 may be performed in similar fashion as discussed for operation 1040. At operation 1070, a third request in another test run is executed by the compute engine using the execution state provided by the third storage node. However, the first request is not re-executed in this other test run. As may be understood, the other storage run may be initiated using a saved execution save point, which may be stored in a library as discussed in connection with FIG. 6. By using an execution state save point, a test run may be started in the middle of the request sequence, by simply loading an intermediate execution state (e.g. the save point) on the storage node. The use execution save points in this manner spares the test manager from having to re-execution requests before the save point to recreate the desired execution state.

Figure 11:
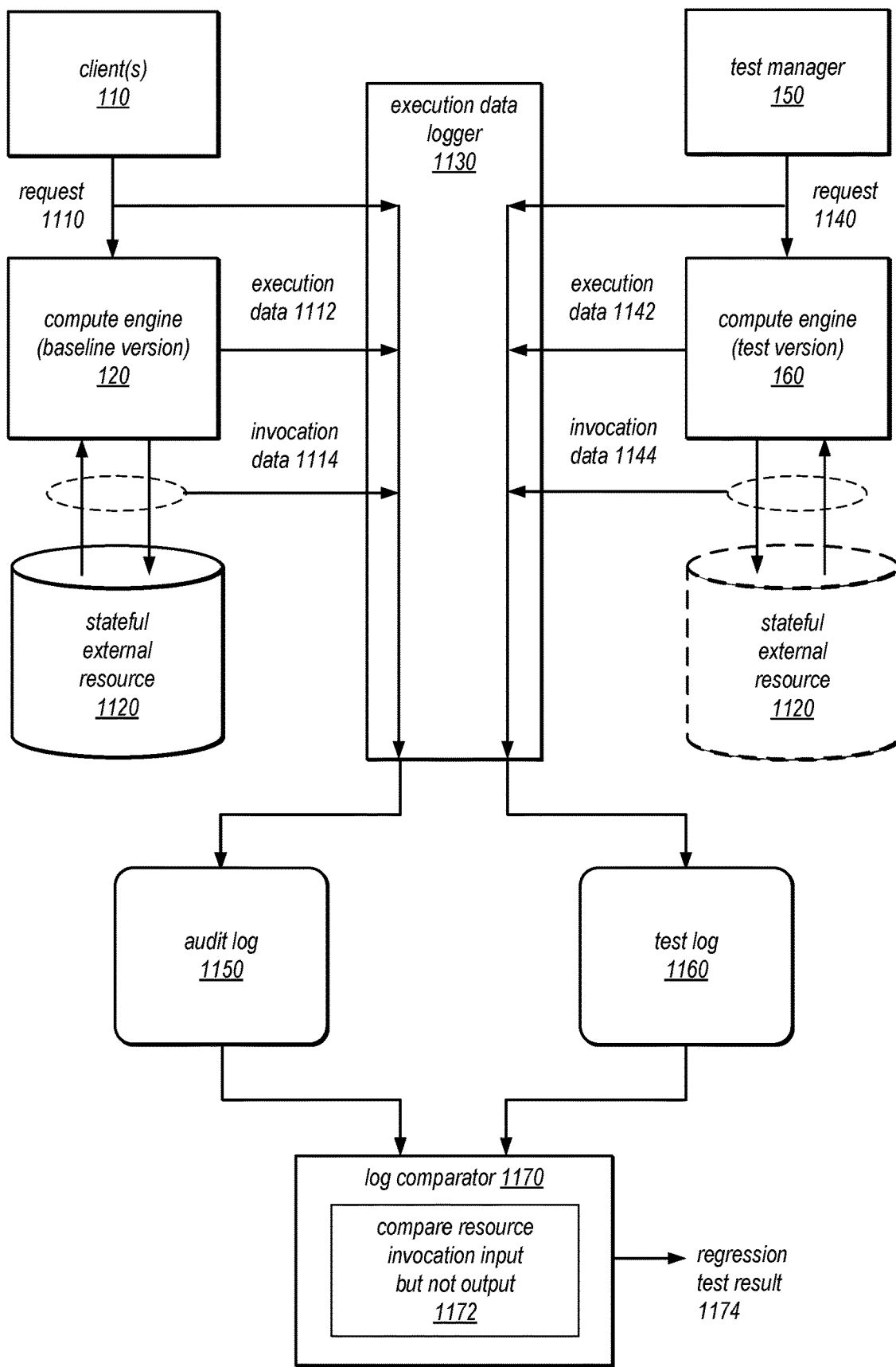
FIG. 11 is a block diagram illustrating a service testing system that refrains from comparing response data from a stateful external resource during regression testing, according to some embodiments.

FIG. 11 is a block diagram illustrating a service testing system that refrains from comparing response data from a stateful external resource during regression testing, according to some embodiments.

In some embodiments, when the service compute engine is handling a request, it may invoke a stateful external resource. The stateful external resource may maintain its own state information that is not readily reproduceable during testing by the service testing system. Examples of such external resource may include external databases or other services or systems. These stateful external resources present a problem for testing systems that rely on the state data to produce deterministic test data. For example, regression test systems may not be able to easily compare logged execution data generated by a test run with the baseline execution data if the execution data depends on a stateful external resource.

To solve this problem, in some embodiments, the service testing system is configured to compare only the input data sent to the stateful external resource, but not the output data received from the invocation. Comparing the inputs is sufficient for most testing purposes, since it can generally be assumed that the external resource has not changed. In particular, by not comparing the output of the invocation, execution logs of the baseline version and test version of the compute engine can be more easily compared.

As shown in FIG. 11, an execution data logger 1130 is used to log execution data from both the baseline version 120 of the compute engine and the test version 160 of the compute engine. As shown, a client 110 issues a request 1110 to the baseline version of the compute engine. The request 1110 is logged by the logger 1130 as part of an audit log 1160 for the baseline version. When the baseline version executes the request, the compute engine produces execution data 1112, such as intermediate results, execution events, performance metrics, etc. Such execution data is logged by the logger 1130. In addition, during execution of the request, the compute engine 120 issues one or more requests to a stateful external resource 1120. The stateful external resource maintains its own state information, which it uses to generate responses. Thus, the response of the external resource may vary depending on the existing state of the external resource. As shown in this example, the execution data logger 1130 also logs the invocation data 1114 of the stateful external resource (e.g. the input data associated with the request to the resource and the output data provided by the response from the resource).

As shown, the execution data logger 1130 may also be used to log execution data for the test version of the compute engine to produce a test log 1170. The logged data may include the test request 1140 issued by the test manager 150, any execution data 1142 generated during execution of the request, and invocation data 1144 associated with the stateful external resource 1120. It is noted that in some embodiments, compute engine 160 may not actually invoke an actual instance of the external resource 1120. For example, the service testing system may be configured to emulate the external resource 1120 to spoof its response. Such spoofed response may also be logged as part of the invocation data 1144.

As shown, the generated audit log 1150 and test log 1160 may be compared using a log comparator 1170 to generate a regression test result 1172. In some embodiments, the log comparator 1170 may be a component of the service testing system 100. When comparing the two logs, the log comparator may be configured 1172 to only compare invocation inputs to the external resource, and not the logged outputs from the invocation. In some embodiments, the comparator will assume for testing purposes that the external resource will produce the same output for both the baseline version and the test version, as long as they invoke the external resource using the same input data. In some embodiments, this comparison behavior 1172 of the comparator may be configurable by the test manager 150 or controlled by configuration parameters specified in the test case data. In some embodiments, the comparator may be able to determine on its own that a particular invocation was made under a test mode, and refrain from comparing output of the invocation based on that determination.

Advantageously, this comparison technique greatly simplifies the testing process for services that use stateful external resources because it relieves the service testing system from having to reproduce the state and execution behavior of the external resource. In some embodiments, the log comparison technique discussed here may be used to generate test results for tests other than regression tests.

Figure 12:
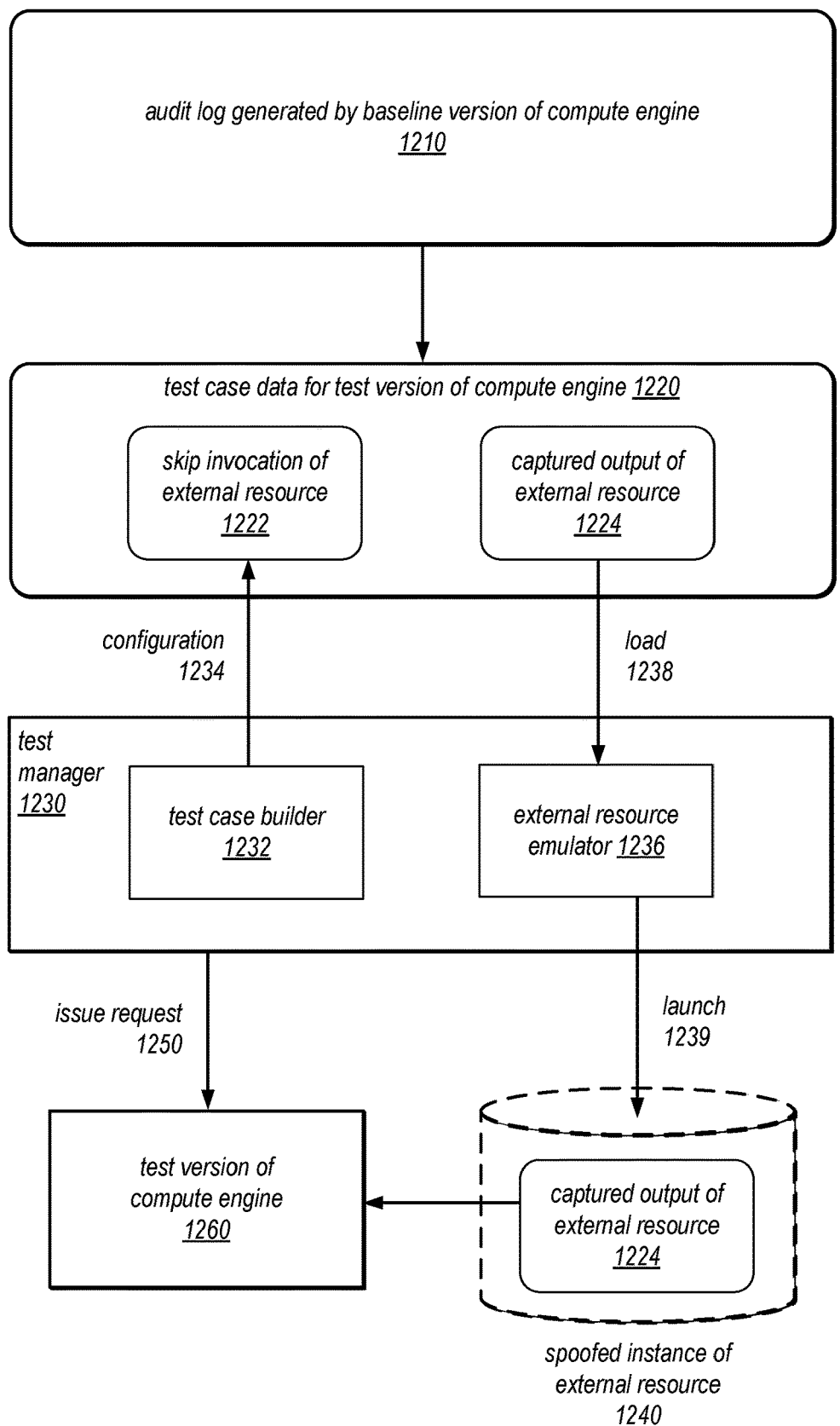
FIG. 12 illustrates components of a service testing system that spoofs the output of an external resource during testing, according to some embodiments.

FIG. 12 illustrates components of a service testing system that spoofs the output of an external resource during testing, according to some embodiments.

As shown in this figure, an audit log 1210 generated by a baseline version of the compute engine (e.g. audit log 1150 of FIG. 11) is used to build test case data 1220 for a test version of the compute engine. In particular, the test case data may include certain data in the audit log, including the captured output 1224 of the external resource during the execution of a production request. Additionally, the test case data 1220 may include a configuration parameter 1222 that was configured 1234 by a test case builder component 1232 of the test manager 1230. The configuration parameter specifies to skip invocation of a particular external resource. In some embodiments, this configuration parameter in the test case data will cause the test manager to create a spoofed instance 1240 of the external resource during the test to provide the previously captured output 1224. In some embodiments, the test case builder 1232 may be the test case builder 330 of FIG. 3A or 3B, and include a user interface to configure various runtime parameters of the test case.

When the test case is executed as a test run, in some embodiments, the test manager 1230 may configure the log comparator according to the configuration parameter 1222 to skip comparison of output data from the external resource. Moreover, the test manager 1230 in this example will load 1238 the captured output 1224 of the external resource, and use an external resource emulator component 1236 to launch 1239 a spoofed or emulated instance of the external resource 1240. In some embodiments, this spoofed or emulated instance may appear to the computed engine 1260 as the actual external resource. The spoofed instance may be configured to intercept any invocations of the external resources from the compute engine, and provide the previously captured output of the external resource to the compute engine, as if it came from the actual external resource. In this manner, the test version of the compute engine will be able to execute the request in the same way as the baseline version of the compute engine using the previously captured output, without the service testing system having to reproduce the execution state of the external resource during the test run.

Figure 13:
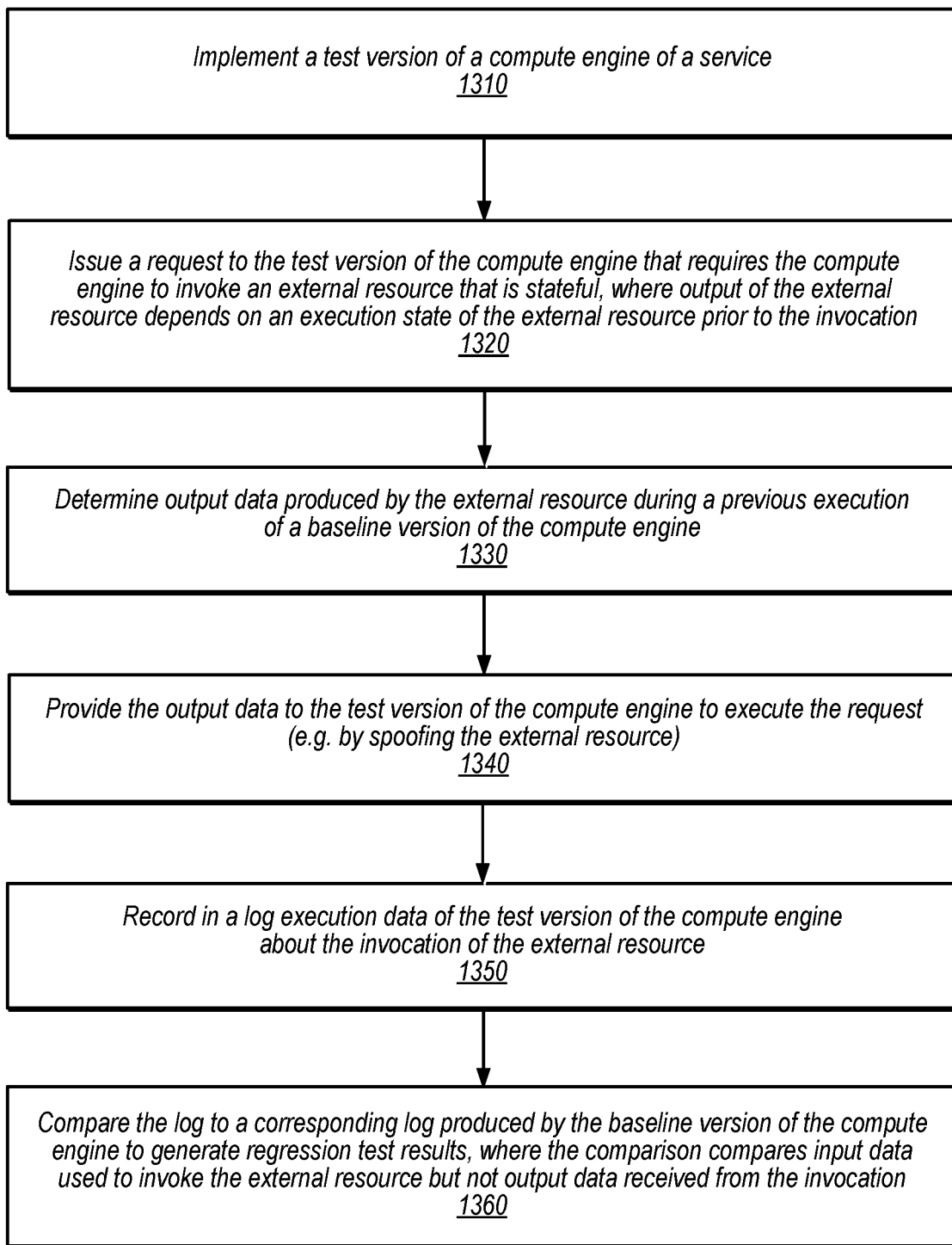
FIG. 13 is a flowchart diagram illustrating a regression test process that refrains from comparing output data from a stateful external resource, according to some embodiments.

FIG. 13 is a flowchart diagram illustrating a regression test process that refrains from comparing output data from a stateful external resource, according to some embodiments. In some embodiments, the depicted process may be implemented by components of a service testing system as discussed in connection with FIG. 11 or FIG. 12.

At operation 1310, a test version of a compute engine of a service is implemented. In some embodiments, the test version of the compute engine may be the compute engine 160 of FIG. 1 and implemented as part of the service test system 100 of FIG. 1.

At operation 1320, a test request is issued to the test version of the compute engine that requires the compute engine to invoke a stateful external resource. Output of the external resource is stateful, in that it depends on an execution state of the external resource prior to the invocation. Examples of stateful resource may include, for example, a database or some other service or system having separate state from the service being tested. In some embodiments, the request may be issued by a test manager, as discussed in connection with FIG. 11 or FIG. 12.

At operation 1330, output data produced by the external resource during a previous execution of a baseline version of the compute engine is determined. In some embodiments, the previous output data of the external resource may be stored as part of test case data (e.g. test case data 1220 of FIG. 12), which may be loaded up by the service testing system during a test run. The test case data may be constructed from an audit log of the baseline version that captures the output during the previous execution.

At operation 1340, the previous output data of the external resource is provided to the test version of the compute engine to execute the test request. In some embodiments, the service testing system may provide the output data by launching an emulated instance of the external resource for testing purposes, and respond to the compute engine's request with a spoofed response, as discussed in connection with FIG. 12. In this manner, the response data can be provided to the test version of the compute engine in the same way that the actual external resource responded to the baseline version of the compute engine.

At operation 1350, the execution data of the test version of the compute engine is recorded in a log. The logged execution data will include data about the invocation of the external resource (e.g. invocation data 1144 of FIG. 11). The execution data may be captured for an entire test run, and stored as a test log (e.g. test log 1160 of FIG. 11) for the test run.

At operation 1360, the test log is compared to a corresponding log produced by the baseline version of the compute engine (e.g. audit log 1150 of FIG. 11) to generate regression test results for the test version. As shown, the comparison will compare the input data used to invoke the external resource, but not the output data received from the invocation. As discussed, in some situations, comparing the invocation input is sufficient as the test is not concerned with changes in the external resource. Accordingly, the behavior (and output) of the external resource may be assumed to be unchanged. In some embodiments, this behavior of the log comparison process may be configurable by the user, for example, to skip comparison of output data for certain specified external resources. In some embodiments, this comparison feature may be used to compare execution logs in tests other than regression tests.

Figure 14:
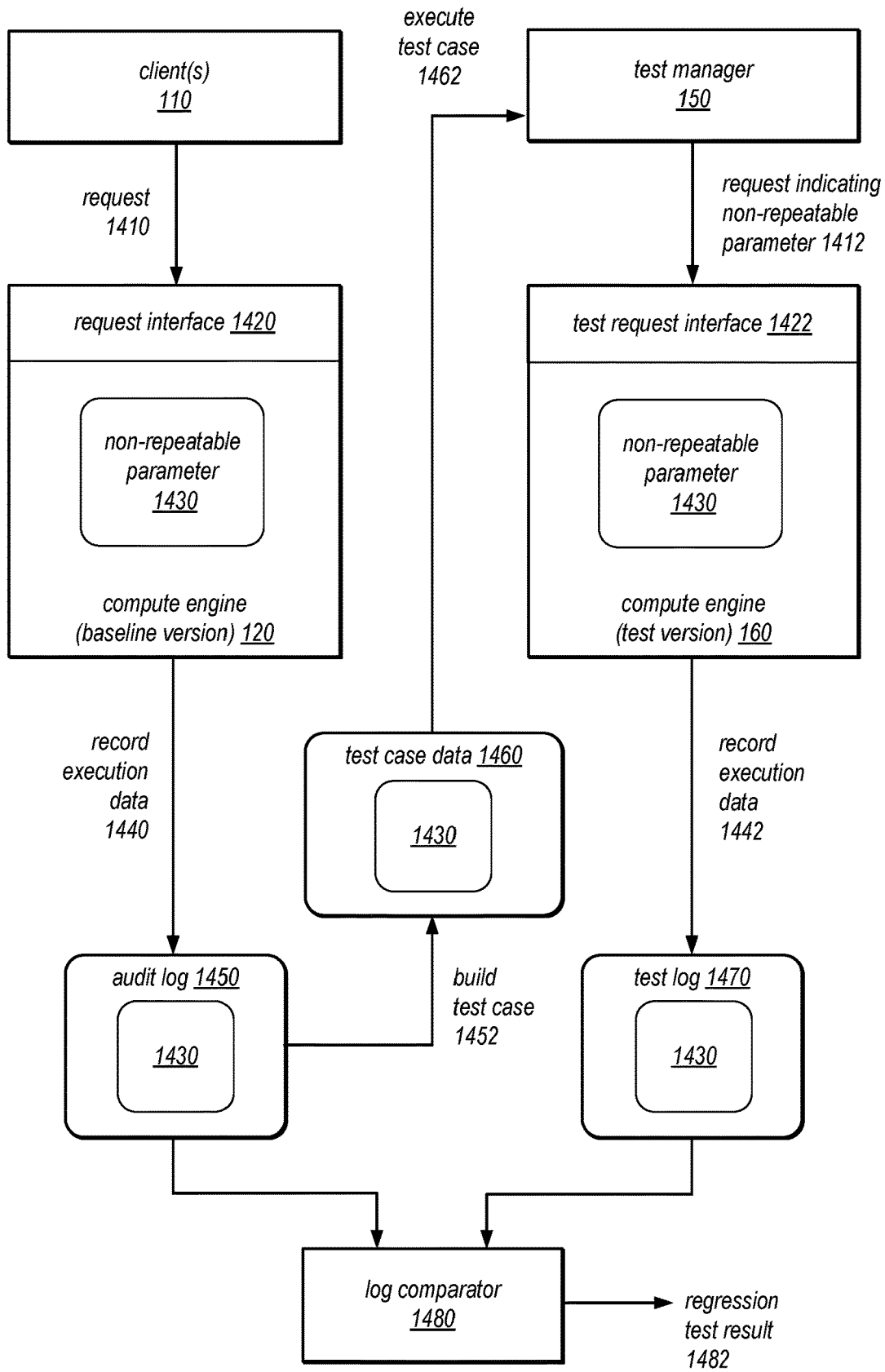
FIG. 14 is a block diagram illustrating a service testing system that refrains from generation of non-repeatable parameters during regression testing, according to some embodiments.

FIG. 14 is a block diagram illustrating a service testing system that refrains from generation of non-repeatable parameters during regression testing, according to some embodiments.

In some embodiments, the production or baseline version of the compute engine is configured to generate a non-repeatable parameter during the handling of requests. Examples of such non-repeatable parameters may include randomly generated values, sequence numbers, unique identifiers, etc. These non-repeatable parameters present a problem for testing systems that require consistent replay of requests, because non-repeatable parameters cannot always be consistently reproduced during testing.

Accordingly, in some embodiments, the service testing system will provide a mechanism to stop the compute engine from generating the non-repeatable parameter during testing, and instead use a pre-recorded value of the parameter provided as input to the compute engine. In some embodiments, the pre-recorded value may be provided via an unexposed interface of the compute engine that is not available to clients in the production environment. In some embodiments, the pre-recorded value may be obtained via other means, for example, as an environment variable that is accessible by the test version of the compute engine. In some embodiments, the logic to accept the non-repeatable parameter via the unexposed interface is implemented in the compute engine without modifying other components or execution behavior of the compute engine. In this manner, the way that the non-repeatable value is obtained does not alter the execution behavior of the test version of the compute engine being tested. Accordingly, the non-repeatable parameters can be reliably reproduced during test replay.

In FIG. 14, a baseline version 120 and a test version 160 of a service compute engine are shown. A client 110 issues a request 1410 to baseline version via a request interface 1420. The request causes the baseline version to generate a non-repeatable parameter 1430 during execution of the request, which may be generated by the non-repeatable parameter generator. Depending on the embodiment, the non-repeatable parameter may be a variety of generated values such as random values, timestamps, sequence numbers, unique identifiers, and the like. In some embodiments, the non-repeatable parameter is a unique transaction identifier generated for a particular request sequence, such as an order ID generated for each order constructed by the item ordering and shipping service 200 of FIG. 2. As shown, the generated non-repeatable parameter 1430 is captured as part of the execution data 1440 of the baseline version and recorded in an audit log 1450 by an execution data logger, which may be the execution data logger 1130 of FIG. 11.

The audit log 1450 may be used to build 1452 a test case, which is encoded in test case data 1460. The test case data 1460 may include a sequence of requests submitted to the baseline version of the compute engine. In some embodiments, the test case data may also include output of the baseline version and intermediate execute states produced by the baseline version, which may be used for testing purposes. In some embodiments, the test case data 1460 may be built using the test case builder 330, as discussed in connection with FIG. 3A or 3B. As shown, the non-repeatable parameter 1430 is copied into the test case data. As shown, when creating a test case, the test case builder may copy over relevant execution data into the test case data, including the non-repeatable parameter 1430. The test case data will be used by the test manager 150 to replay 1462 the recorded sequence of requests on the test version of the compute engine 160.

As shown, when the test run is replayed on the test version of the compute engine 160, the non-repeatable parameter 1430 is provided to the test version. The test version will use the provided value as the non-repeatable parameter during its execution, without generating its own value for the non-repeatable parameter. As shown in this example, the non-repeatable parameter is provided as an input value along with a test request 1412 to the compute engine. In some embodiments, the test request 1412 may be directed to a test request interface 1422 of the compute engine that is not exposed or accessible to production clients of the service (e.g. clients 110). The unexposed interface maybe exposed or accessible only by privileged clients such as the test manager 150. In some embodiments, the recorded value of the non-repeatable parameter may be provided to the test version in other ways. For example, the test manager may connect to the test version of the compute engine via a side channel or special test configuration API, to specify the value of the non-repeatable parameter for a test run or request. As another example, the non-repeatable value may be provided as an environmental variable or as part of the execution state provided to the compute engine. As shown, the recorded value of the non-repeatable parameter will be logged as part of the execution data 1442 by the execution data logger to produce a test log 1470.

As shown, the service testing system here implements log comparator 1480 that compares the audit log 1450 and test log 1470 to generate a regression test result 1482. Log comparator 1480 may be implemented in a similar manner as log comparator 1170, as discussed in connection with FIG. 11. Advantageously, because the value of the non-repeatable parameter is the same in both logs 1450 and 1470, the log comparator 1480 will see matching values for the parameter in the two logs, and matching data for all elements of the execution data that are derived from the non-repeatable parameter. This disclosed technique thus reduces the amount of execution data differences that are generated by the comparator, and greatly simplifies the log comparison and test result generation process.

Figure 15:
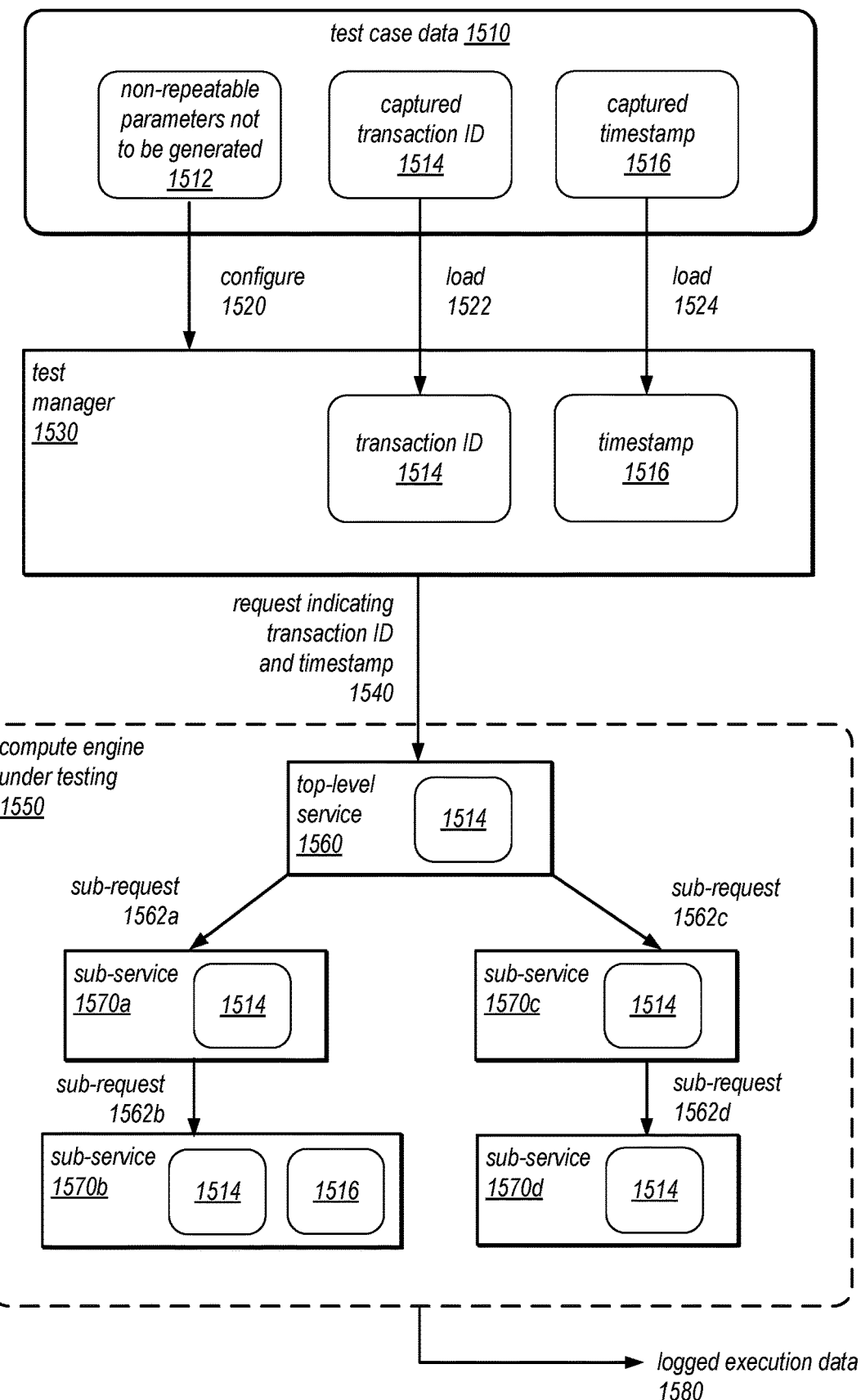
FIG. 15 illustrates the use of multiple captured non-repeatable parameter values during testing of a compute engine, according to some embodiments.

FIG. 15 illustrates the use of multiple captured non-repeatable parameter values during testing of a compute engine, according to some embodiments.

As shown, the figure depicts test case data 1510 that was created to test a test version of a compute engine. The test case data 1510 in this example includes configuration data 1512 associated with the test case, a captured transaction ID 1514, and a capture timestamp value. The parameters 1514 and 1516 represent different types of non-repeatable parameters that were captured from a previous run of the requests.

When the test case 1510 is executed as a test run, the test manager 1530 may first examine the configuration data 1512 for the test case. The configuration data 1512 may specify how the test run is to be executed, and how the test case data will be used. In some embodiments, this configuration data may be specified manually during or after the creation of the test case. In this example, the configuration data 1512 specifies which non-repeatable parameters should not be generated during the test run (and instead be accepted as input values from the test manager). The test manager 1530 will execute the test run according to this configuration data.

As shown in this example, the test manager 1530 will execute the test case so that neither parameters 1514 or 1516 are generated by the test version 1550 of the compute engine. To do this, the test manager 1530 loads 1522, 1524 the captured transaction ID 1514 and the timestamp value 1516 from the test case data, and passes these values to the compute engine under testing 1550. As shown in this example, the transaction ID is passed in as part of a request 1540 to the compute engine, for example, as an input parameter of a service call. Request 1540 may be directed to a special testing interface of the compute engine that is not published or accessible to production clients. In some embodiments, if the test manager does not specify an input value for a non-repeatable parameter in the request 1540, the compute engine will generate a value for that parameter to execute the request. As discussed in connection with FIG. 14, different methods of passing in the transaction ID to the compute engine may be used, depending on the embodiment.

Request 1540 will cause the compute engine under testing 1550 to refrain from generating its own value for the transaction ID and the timestamp value, and instead, use the provided transaction ID 1514 and timestamp value 1516 in its execution. In some embodiments, the mechanism to use such input values for non-repeatable parameters is implemented so that it does not alter other functionalities of the compute engine. The rest of the components in the compute engine may then execute as normal, as if the compute engine had generated the transaction ID and the timestamp itself. As shown in this example, the transaction ID and timestamp value are distributed to many components in the compute engine. The transaction ID is distributed by a top-level service 1560 to a number of sub-services 1570*a-d* via sub-requests 1562*a-d*. Each of the sub-services will used the transaction ID, possibly to generate additional non-repeatable parameters and execution data that will be logged 1580 in the test log. Moreover, the timestamp value 1516 is also passed to one or more of the sub-services, and used by at least one of the sub-services 1570*b*. By reusing the captured values of these non-repeatable parameters in the test run, the test execution will generate test log data that can be more easily compared to the logged execution data of the previous run.

Figure 16:
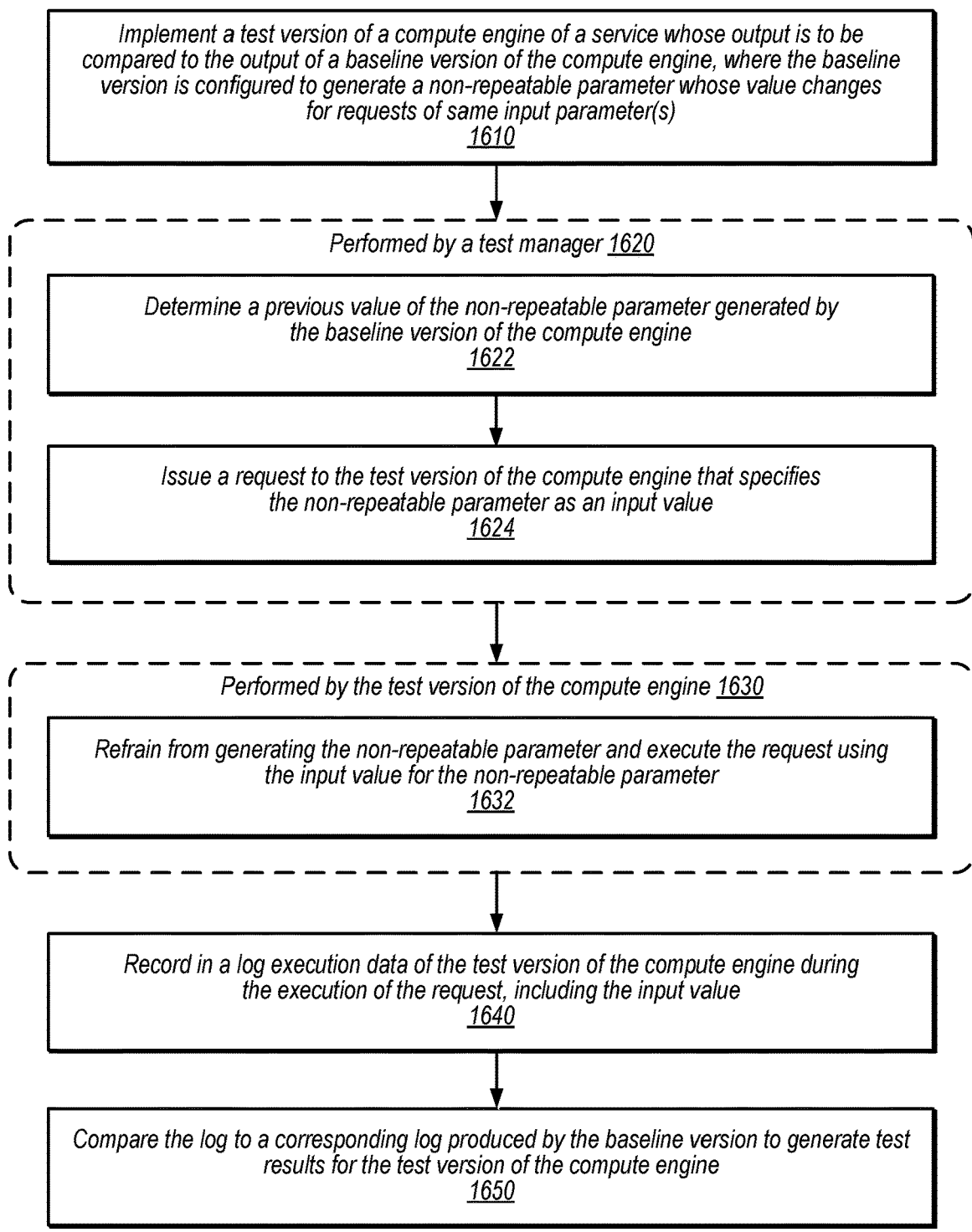
FIG. 16 is a flowchart diagram illustrating a test process that refrains from generation of a non-repeatable parameter, according to some embodiments.

FIG. 16 is a flowchart diagram illustrating a test process that refrains from generation of a non-repeatable parameter, according to some embodiments. In some embodiments, the depicted process may be implemented by components of a service testing system as discussed in connection with FIG. 14 or FIG. 15.

At operation 1610, a test version of a compute engine of a service is implemented. The test version of the compute engine may be the compute engine 160 of FIG. 1 and implemented as part of the service test system 100 of FIG. 1. The output of the service is to be compared to output of a baseline version of the compute engine that is configured to generate a non-repeatable parameter whose value changes for requests of the same input parameters. For example, the baseline version of the compute engine may be the compute engine 120 as discussed in connection with FIG. 14. The non-repeatable parameter may be the non-repeatable parameter 1442 of FIG. 14, and may include parameters such as random values, unique identifiers, sequence numbers, time-based data, and the like.

Operations 1622 and 1624 in this example are performed 1620 by a test manager, such as test manager 150 or test manager 1530 of FIG. 15. At operation 1622, a previous value of the non-repeatable parameter generated by the baseline version of the compute engine is determined. In some embodiments, the previous value may be recorded in an audit log generated by the baseline version, and then copied over to test case data for the test version of the compute engine. When the test case is to be executed, the test manager may read the test case data and load the recorded value for the non-repeatable parameter for the execution.

At operation 1624, the test manager issues a request to the test version of the compute engine, where the request specifies the non-repeatable parameter as an input value or parameter. The test version of the compute engine may implement an unexposed request interface (e.g. interface 1440 of FIG. 14) to receive the request, where the unexposed interface is not publicly exposed to production clients, only privileged clients such as the test manager. The unexposed interface may allow the caller to provide additional configuration parameters for testing, such as a specified value of the non-repeatable parameter.

Operation 1632 in this example is performed 1630 by the test version of the compute engine. At operation 1632, the test version of the compute engine refrains from generating its own value of the non-repeatable parameter, and instead executes the request using the input value for the non-repeatable parameter received with the request. In some embodiments, the logic used to accept the input value for the non-repeatable parameter may be implemented so that it does not alter the rest of the functionality of the compute engine.

At operation 1640, execution data of the test version of the compute engine is recorded in a log (e.g. test log 1470) during the execution of the request. The recording will also record the value of the non-repeatable parameter used by the test version of the compute engine. In some embodiments, the logging may be performed by the compute engine itself. In some embodiments, the logging may be performed by a separate component implemented by the service testing system, such as the execution data logger 1450 of FIG. 14.

At operation 1640, the log is compared to a corresponding log (e.g. audit log 1460) produced by the baseline version of the compute engine, to generate test results for the test version of the compute engine. The test results may be generated for a regression test, which compares relevant execution data generated by the baseline version and the test version to find differences, which may indicate a undesired regression of the test version. Advantageously, because the same value of the non-repeatable parameter is used for both versions of the compute engine, the comparison process can be greatly simplified to only detect substantive differences that are not related to the non-repeatable parameter. As a result, the comparison process may be able to complete more quickly and generate more comprehensible test results.

Figure 17:
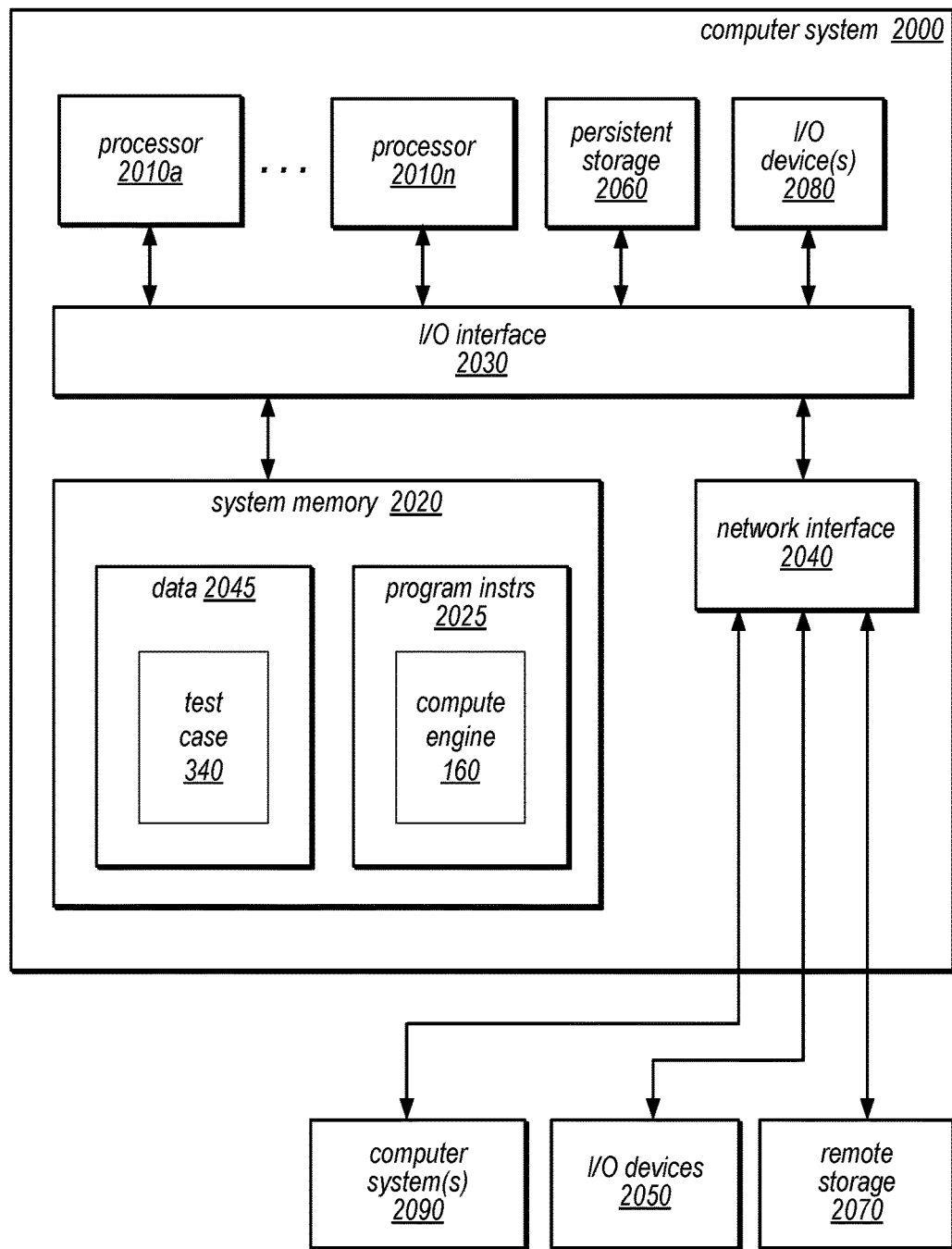
FIG. 17 illustrates a computer system that can be used to implement portions of a service testing system that provides consistent replay of stateful requests during testing of a service, according to some embodiments.

FIG. 17 illustrates a computer system that can be used to implement portions of a service testing system that provides consistent replay of stateful requests during testing of a service, according to some embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that may store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. For example, the program instructions 2025 may implement portions of the compute engine 160, as discussed in connection with FIG. 1. In various embodiments, program instructions 2025 may be encoded in platform native binary, any interpreted language such as JAVA byte-code, or in any other language such as C/C++, JAVA, etc., or in any combination thereof. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, SOLARIS, MACOS, WINDOWS, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be used to store data used by the program instructions. For example, the data store 2045 may be used to store a test case 340 for testing the compute engine, as discussed in connection with FIG. 3A or 3B. For example, the data may include other data stored by the database tier (e.g., on a primary node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, data pages, data records, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement one or more storage system server nodes, primary nodes, read-only node nodes, and/or clients of the database systems described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in this figure (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

Disclosed embodiments in this disclosure include embodiments described by the following clauses:

Clause 1:

A system comprising:
one or more computing devices that implement a test version of a compute engine of a service, configured to:
receive a request directed to the test version of the compute engine, wherein the request is a stateful request whose output depends on an execution state of the compute engine prior to the request;
access the execution state from a storage subsystem of the service; and
execute the request according to the execution state;
wherein result data from the execution of the request is logged and compared to corresponding result data produced by a baseline version of the compute engine to generate test results for a regression test; and
one or more computing devices that implement the storage subsystem of the service, configured to:
providing contents of execution states to the baseline version of the compute engine, wherein the execution states are stored in a data store;
determine that a requested access of the execution state from the test version of the compute engine is associated with a test of the compute engine, and in response:
create a test copy of the execution state in a volatile memory of the storage subsystem, wherein the test copy is created without accessing the data store; and
provide contents of the test copy to the test version of the compute engine as the execution state during the execution of the request.

Clause 2:

The system of Clause 1, wherein:
the storage subsystem is configured to update the test copy of the execution state without changing contents of the data store.

Clause 3:

The system of any of Clauses 1 or 2, wherein:
the request is executed as part of a test run that replays, on the test version of the compute engine, a sequence of requests previously executed on the baseline version; and
the storage subsystem is configured to create multiple instances of execution states for multiple concurrent executing test runs.

Clause 4:

The system of any of Clauses 1 to 3, wherein the storage subsystem provides an access interface for the baseline version of the compute engine to access execution states, and the test copy of the execution state is accessed by the test version of the compute engine via the same access interface.

Clause 5:

The system of any of Clauses 1 to 4, wherein the service implements an item ordering and shipping service, and the execution state includes data about a particular item order constructed according a sequence of user requests.

Clause 6:

A method comprising:
performing, by one or more computing devices that implement a test version of a compute engine of a service:
receiving a request directed to the test version of the compute engine, wherein the request is a stateful request whose output depends on an execution state of the compute engine prior to the request;
accessing the execution state from a storage subsystem of the service;
executing the request according to the execution state; and
performing, by one or more computing devices that implement the storage subsystem of the service:
providing contents of execution states to a baseline version of the compute engine of the service, wherein the execution states are stored in a data store;
determining that a requested access of the execution state from the test version of the compute engine is associated with a test of the compute engine, and in response:
creating a test copy of the execution state in a volatile memory of the storage subsystem, wherein the test copy is created without accessing the data store; and
providing contents of the test copy to the test version of the compute engine as the execution state during the execution of the request.

Clause 7:

The method of Clause 6, wherein the execution of the request is performed as a part of a regression test, and the method further comprises:
logging result data from the executing the request; and
comparing the result data to corresponding result data generated by the baseline version of the compute engine to produce test results for the regression test.

Clause 8:

The method of Clauses 6 or 7, further comprising:
updating the test copy of the execution state during execution of the request without changing contents of the data store.

Clause 9:

The method of any of Clauses 6 to 8, wherein the creation of the test copy is performed in response to an initiation of the test by a test manager.

Clause 10:

The method of any of Clauses 6 to 9, wherein the storage subsystem provides an access interface for the baseline version of the compute engine to access execution states, and the test copy of the execution state is accessed by the test version of the compute engine via the same access interface.

Clause 11:

The method of any of Clauses 6 to 10, wherein:
the request is executed as part of a test run that replays, on the test version of the compute engine, a sequence of requests previously executed on the baseline version; and
the method further comprises creating, in the volatile memory, multiple instances of execution states for multiple concurrently executing test runs.

Clause 12:

The method of any of Clauses 6 to 11, wherein:
the storage subsystem executes a process configured to handle execution state access requests from the test version of the compute engine; and
the test copy of the execution state is created in memory allocated to the process.

Clause 13:

The method of any of Clauses 6 to 12, wherein:
the storage subsystem stores a plurality of execution states for the baseline version of the compute engine in a block-based data store; and
the creating of the test copy of the execution state comprises creating in the volatile memory a subset of blocks of the block-based data store to emulate the block-based data store.

Clause 14:

The method of any of Clauses 6 to 13, wherein the test copy of the execution state is created based on test case data associated with a test case that specifies a sequence of requests directed to the service and a sequence of respective execution states produced by the baseline version of the compute engine from the sequence of requests.

Clause 15:

The method of any of Clauses 6 to 14, further comprising:
analyzing an audit log generated by the baseline version of the compute engine to select request sequences executed by the baseline version as test cases for the test version and compile test case data for the test cases.

Clause 16:

One or more non-transitory computer-accessible storage media storing program instructions that when executed on or across one or more processors cause the one or more processors to implement a storage subsystem of a service testing system, wherein:
the service testing system implements a test version of a compute engine of a service that is configured to:
receive a request directed to the test version of the compute engine, wherein the request is a stateful request whose output depends on an execution state of the compute engine prior to the request;
access the execution state from a storage subsystem of the service;
execute the request according to the execution state; and
the program instructions when executed on or across the one or more processors cause the storage subsystem to:
provide, from a data store, contents of execution states to a baseline version of the compute engine of the service;

determine that a requested access of the execution state from the test version of the compute engine is associated with a test of the compute engine, and in response:
  create a test copy of the execution state in a volatile memory of the storage subsystem, wherein the test copy is created without accessing the data store; and
  provide contents of the test copy the test version of the compute engine as the execution state during the execution of the request.

Clause 17:
The one or more non-transitory computer-accessible storage media of Clause 16, wherein the program instructions when executed on or across the one or more processors cause the storage sub system to:
  update the test copy of the execution state without changing contents of the data store.

Clause 18:
The one or more non-transitory computer-accessible storage media of Clauses 16 or 17, wherein:
  the request is executed as part of a test run that replays, on the test version of the compute engine, a sequence of requests previously executed on the baseline version; and
  the program instructions when executed on or across the one or more processors cause the storage subsystem to create multiple instances of execution states for multiple concurrently executing test runs.

Clause 19:
The one or more non-transitory computer-accessible storage media of any of Clauses 16 to 18, wherein the storage subsystem provides an access interface for the baseline version of the compute engine to access the execution states, and the program instructions when executed on or across the one or more processors cause the storage subsystem to provide contents of the test copy of the execution state via the same access interface.

Clause 20:
The one or more non-transitory computer-accessible storage media of any of Clauses 16 to 19, wherein to create the test copy of the execution state, the program instructions when executed on or across the one or more processors cause the storage subsystem to create in the volatile memory a subset of blocks of the data store to emulate the data store.

Clause 21:
A system comprising:
one or more computing devices that implement a service testing system, configured to:
  implement a test version of a compute engine of a service;
  issue a request to the test version of the compute engine that requires the test version of the compute engine to invoke an external resource that is stateful, wherein output of the external resource depends on an execution state of the external resources prior to the invocation;
  record, in a log, execution data of the test version of the compute engine about the invocation of the external resource; and
  compare the log to a corresponding log produced by a baseline version of the compute engine to generate test results for a regression test of the compute engine, wherein the comparison compares, in the two logs, input data used to invoke the external resource but not output data received from the invocation.

Clause 22:
The system of Clause 21, wherein the service testing system is configured to:
  determine recorded output data produced by the external resource during an execution of the baseline version of the compute engine; and
  provide the recorded output data to the test version of the compute engine to execute the request.

Clause 23:
The system of Clause 22, wherein to provide the recorded output data to the test version of the compute engine, the service testing system is configured to emulate the external resource.

Clause 24:
The system of any of Clauses 21 to 23, wherein the external resource is a database or another service distinct from the service under testing.

Clause 25:
The system of any of Clauses 21 to 24, wherein the service is an item ordering and shipping service, and external resource is a catalog of items accessed by the item ordering and shipping service.

Clause 26:
A method comprising:
performing, by one or more computing devices that implement a service testing system:
  issuing a request to a test version of the compute engine of a service that requires the test version of the compute engine to invoke an external resource that is stateful, wherein output of the external resource depends on an execution state of the external resources prior to the invocation;
  recording, in a log, execution data of the test version of the compute engine about the invocation of the external resource; and
  comparing the log to a corresponding log produced by a baseline version of the compute engine to generate test results for the compute engine, wherein the comparison compares, in the two logs, input data used to invoke the external resource but not output data received from the invocation.

Clause 27:
The method of Clause 26, wherein the test results are generated for a regression test of the test version of the compute engine.

Clause 28:
The method of Clause 27, wherein the baseline version is another test version of the compute engine under testing by the service testing system, and the regression test is performed between the test version and the other test version of the compute engine.

Clause 29:
The method of any of Clauses 26 to 28, further comprising performing, by the service testing system:
  determining recorded output data produced by the external resource during an execution of the baseline version of the compute engine; and
  providing the recorded output data to the test version of the compute engine to execute the request.

Clause 30:
The method of Clause 29, wherein:
  the providing of the recorded output data to the test version of the compute engine comprises emulating, by a test manager, output of the external resource.

Clause 31:

The method of Clause 29, further comprising:
analyzing an audit log generated by the baseline version of the compute engine to compile test case data including the request; and
wherein the recorded output data is determined from the test case data.

Clause 32:

The method of Clause 31, further comprising:
including in the test case data a configuration setting specifying to not compare output data of the external resource.

Clause 33:

The method of any of Clauses 26 to 32, wherein the external resource is a database or another service distinct from the service under testing.

Clause 34:

The method of any of Clauses 26 to 33, wherein the service is an item ordering and shipping service, and external resource is a catalog of items accessed by the item ordering and shipping service.

Clause 35:

One or more non-transitory computer-accessible storage media storing program instructions that when executed on or across one or more processors implement a service testing system and cause the service testing system to:
issue a request to a test version of the compute engine of a service that requires the test version of the compute engine to invoke an external resource that is stateful, wherein output of the external resource depends on an execution state of the external resources prior to the invocation;
record, in a log, execution data of the test version of the compute engine about the invocation of the external resource; and
compare the log to a corresponding log produced by a baseline version of the compute engine to generate test results for the compute engine, wherein the comparison compares, in the two logs, input data used to invoke the external resource but not output data received from the invocation.

Clause 36:

The one or more non-transitory computer-accessible storage media of Clause 35, wherein the program instructions when executed on or across the one or more processors cause the service testing system to:
perform a regression test of the test version of the compute engine based on the test results.

Clause 37:

The one or more non-transitory computer-accessible storage media of Clauses 35 or 36, wherein the program instructions when executed on or across the one or more processors cause the service testing system to:
determine recorded output data produced by the external resource during an execution of the baseline version of the compute engine; and
provide the recorded output data to the test version of the compute engine to execute the request.

Clause 38:

The one or more non-transitory computer-accessible storage media of Clause 37, wherein to provide the recorded output data to the test version of the compute engine, the program instructions when executed on or across the one or more processors cause the service testing system to emulate the external resource to interface with the test version of the compute engine.

Clause 39:

The one or more non-transitory computer-accessible storage media of Clause 38, wherein to emulate the external resource, the program instructions when executed on or across the one or more processors cause the service testing system to emulate a database or another service distinct from the service under testing.

Clause 40:

The one or more non-transitory computer-accessible storage media of Clause 38, wherein the program instructions when executed on or across the one or more processors cause the service testing system to:
execute a test version of an item ordering and shipping service; and
emulate a response from a catalog of items accessed by the baseline version of the item ordering and shipping service.

Clause 41:

A system comprising:
one or more computing devices that implement a service testing system, configured to:
implement a test version of a compute engine of a service, wherein output of the test version is to be compared to output of a baseline version of the compute engine, and the baseline version is configured to generate a non-repeatable parameter whose value changes for requests of same input parameters;
issue a request to the test version of the compute engine, wherein the request specifies the non-repeatable parameter as an input value and causes the test version of the compute engine to:
refrain from generating the non-repeatable parameter; and
execute the request using the input value for the non-repeatable parameter;
record in a log execution data of the test version of the compute engine during the execution of the request, including the input value; and
compare the log to a corresponding log produced by the baseline version to generate test results for the test version of the compute engine.

Clause 42:

The system of Clause 41, wherein the service testing system is configured to:
determine a previous value of the non-repeatable parameter generated by the baseline version of the compute engine; and
specify the previous value as the input value in the request issued to the test version of the compute engine.

Clause 43:

The system of Clause 42, wherein:
the previous value is stored in test case data associated with the request;
the test case data is compiled from an audit log generated by the baseline version; and
the service testing system implements a test manager configured to:
obtain the previous value of the non-repeatable parameter from the test case data; and
perform the issuance of the request to the test version of the compute engine specifying the previous value.

Clause 44:

The system of any of Clauses 41 to 43, wherein to execute the request using the input value for the non-repeatable parameter, the test version of the compute engine is configured to issue one or more sub-requests to one or more sub-services, wherein the one or more sub-requests specify the input value as an input parameter to the one or more sub-services.

Clause 45:

The system of any of Clauses 41 to 44, wherein:

the service is an item ordering and shipping service; and the non-repeatable parameter is an identifier for an item order.

Clause 46:

A method comprising:

performing, by one or more computing devices that implement a service testing system:

implementing a test version of a compute engine of a service, wherein the test version implements one or more modifications to a baseline version of the compute engine, and the baseline version is configured to generate a non-repeatable parameter whose value changes for requests of same input parameters;

issuing a request to the test version of the compute engine, wherein the request specifies the non-repeatable parameter as an input value; and responsive to the request, performing, by the test version of the compute engine:

refraining from generating the non-repeatable parameter; and executing the request using the input value for the non-repeatable parameter.

Clause 47:

The method of Clause 46, wherein:

the execution of the test version of the compute engine is performed as part of a regression test; and the method further comprises:

recording in a log execution data of the test version of the compute engine during the execution of the request, including the input value; and comparing the log with a corresponding log generated by the baseline version to produce test results for the regression test.

Clause 48:

The method of Clauses 46 or 47, further comprising performing, by the service testing system:

determining a previous value of the non-repeatable parameter generated by the baseline version of the compute engine; and specifying the previous value as the input value in the request issued to the test version of the compute engine.

Clause 49:

The method of Clause 48, wherein:

the previous value is stored in test case data associated with the request;

the test case data is compiled from an audit log generated by the baseline version; and the method further comprises obtaining, by a test manager of the service testing system, the previous value of the non-repeatable parameter from the test case data to include in the request to the test version of the compute engine.

Clause 50:

The method of any of Clauses 46 to 49, further comprising:

receiving, by the test version of the compute engine, the request via a testing interface of the compute engine, wherein the testing interface is not exposed to clients of a production version of the service.

Clause 51:

The method of any of Clauses 46 to 50, wherein:

the request specifies a second input value for a second non-repeatable parameter generated by the baseline version of the compute engine; and the method further comprises performing, by the test version of the compute engine and responsive to the request:

refraining from generating the second non-repeatable parameter; and executing the request using the second input value for the second non-repeatable parameter.

Clause 52:

The method of any of Clauses 46 to 51, wherein executing the request using the input value for the non-repeatable parameter comprises issuing one or more sub-requests to one or more sub-services, and the one or more sub-requests specify the input value as an input parameter to the one or more sub-services.

Clause 53:

The method of any of Clauses 46 to 52, wherein:

the service is an item ordering and shipping service; and the non-repeatable parameter is an identifier for an item order.

Clause 54:

The method of any of Clauses 46 to 53, wherein the non-repeatable parameter is a random value generated by the baseline version of the compute engine.

Clause 55:

One or more non-transitory computer-accessible storage media storing program instructions that when executed on or across one or more processors implement a service testing system, wherein:

the service testing system implements a test version of a compute engine of a service;

the test version implements one or more modifications to a baseline version of the compute engine;

the baseline version is configured to generate different values for a non-repeatable parameter in response to requests specifying same input parameters; and the program instructions when executed on or across one or more processors cause the service testing system to:

issue a request to the test version of the compute engine, wherein the request specifies the non-repeatable parameter as an input value; and cause the test version of the compute engine to execute the request, including to:

refrain from generating the non-repeatable parameter; and execute the request using the input value for the non-repeatable parameter.

Clause 56:

The one or more non-transitory computer-accessible storage media of Clause 55, wherein the program instructions when executed on or across the one or more processors cause the service testing system to:

issue the request as part of a regression test of the test version of the compute engine;

record in a log execution data of the test version of the compute engine during the execution of the request, including the input value; and compare a log generated by the execution with a corresponding log generated by the baseline version to produce test results for the regression test.

Clause 57:

The one or more non-transitory computer-accessible storage media of Clauses 55 or 56, wherein the program instructions when executed on or across the one or more processors cause the service testing system to:

determine a previous value of the non-repeatable parameter generated by the baseline version of the compute engine; and specify the previous value as the input value in the request issued to the test version of the compute engine.

Clause 58:

The one or more non-transitory computer-accessible storage media of any of Clauses 55 to 57, wherein the program instructions when executed on or across the one or more processors cause the test version of the compute engine to:
receive the request via a testing interface of the compute engine, wherein the testing interface is not exposed to clients of a production version of the service.

Clause 59:

The one or more non-transitory computer-accessible storage media of any of Clauses 55 to 58, wherein to execute the request, the program instructions when executed on or across the one or more processors cause the test version of the compute engine to issue one or more sub-requests to one or more sub-services, and the one or more sub-requests specify the input value as an input parameter to the one or more sub-services.

Clause 60:

The one or more non-transitory computer-accessible storage media of any of Clauses 55 to 59, wherein the program instructions when executed on or across the one or more processors cause the service testing system to:
implement a test version of an item ordering and shipping service, wherein the non-repeatable parameter is an identifier for an item order generated by the item ordering and shipping service.

Clause 61:

A system comprising:
one or more computing devices that implement a service testing system, configured to:
implement a test version of a compute engine of a service and a plurality of storage nodes configured to store execution states for test runs executed on test version of the compute engine;
execute a first request of a test run on the test version of a compute engine of a service, wherein the execution of the first request changes an execution state of the test run provided by a first storage node;
obtain the execution state as changed by the first request from the first storage node;
recreate the execution state at a second storage node; and
execute a second request of the test run on the compute engine, wherein the second request is a stateful request whose output depends on the execution state, and the execution state is provided by the second storage node during the execution of the second request.

Clause 62:

The system of Clause 61, wherein the service testing system is configured to implement a test manager configured to receive the execution state from the test version of the compute engine after execution of the first request and provide the execution state to the test version of the compute engine before execution of the second request.

Clause 63:

The system of Clauses 61 or 62, wherein:
the test version of the compute engine is implemented using a plurality of compute nodes with different versions of the compute engine; and
the service testing system causes the first request of the test run to be executed by a first version of the compute engine and the second request of the test run to be executed by a second version of the compute engine distinct from the first version.

Clause 64:

The system of any of Clauses 61 to 63, wherein the service testing system is configured to:
record execution data at different points of the test run in a test log; and
compare the test log to a corresponding log produced by a baseline version of the compute engine to generate test results for the test version of the compute engine.

Clause 65:

The system of any of Clauses 61 to 64, wherein the service testing system is configured to:
save the execution state changed by the first request; and
execute a third request in another test run using the saved execution state and without re-executing the first request in the other test run.

Clause 66:

A method comprising:
performing, by one or more computing devices that implement a service testing system:
executing a first request of a test run on a test version of a compute engine of a service, wherein the execution of the first request changes an execution state of the test run provided by a first storage node;
obtaining the execution state as changed by the first request from the first storage node;
recreating the execution state at a second storage node; and
executing a second request of the test run on the compute engine, wherein the second request is a stateful request whose output depends on the execution state, and the execution state is provided by the second storage node during the execution of the second request.

Clause 67:

The method of Clause 66, wherein:
the service testing system implements a test manager on a server executing the test version of the compute engine; and
the obtaining of the execution state from the first storage node comprises:
receiving, at the test version of the compute engine, the execution state from the first storage node; and
receiving, at the test manager, the execution state from the first storage node; and
the recreating of the execution state on the second storage node comprises:
sending, by the test manager, the execution state to the test version of the compute engine; and
sending, by the test version of the compute engine, the execution state to the second storage node.

Clause 68:

The method of Clauses 66 or 67, further comprising performing, by the first storage node:
determining that the first request is executed under a test mode; and
based on the determination that the first request is executed under the test mode, returning the execution state changed by the first request in response to the first request.

Clause 69:

The method of Clause 68, further comprising performing, by the service testing system:
enabling the test mode on the first storage node, wherein the enabling of the test mode causes the first storage node to return the execution state and does not change functionality of the test version of the compute engine.

Clause 70:

The method of Clause 68, wherein:
the service stores execution states for a production version of the compute engine in a data store accessible to a plurality of storage nodes, including the first and second storage nodes; and
the method comprises performing, by the first storage node:
based on the determination that the first request is executed under the test mode, creating an in-memory copy of the execution state at the first storage node without accessing the data store.

Clause 71:

The method of Clause 70, wherein:
the data store is a block-based data store; and
the creation of the in-memory copy of the execution state comprises emulating a subset of blocks of the block-based data store.

Clause 72:

The method of any of Clauses 66 to 71, wherein:
the test version of the compute engine is implemented using a plurality of compute nodes having different versions of the compute engine; and
the method comprises causing the first request of the test run to be executed by a first version of the compute engine and the second request of the test run to be executed by a second version of the compute engine distinct from the first version.

Clause 73:

The method of any of Clauses 66 to 72, further comprising performing, by the service testing system:
recreating the execution state as modified by the first request at a third storage node; and
executing a third request in another test run using the execution state provided by the third storage node, wherein the third request is executed without re-executing the first request in the other test run.

Clause 74:

The method of Clause 73, further comprising performing, by the service testing system:
saving the execution state as modified by the first request as an execution state save point in a library of executions state save points; and
retrieving the execution state save point from the library to recreate the execution state at the third storage node.

Clause 75:

One or more non-transitory computer-accessible storage media storing program instructions that when executed on or across one or more processors implement a service testing system and cause the service testing system to:
cause a first request of a test run to be executed by a test version of a compute engine of a service, wherein the first request changes an execution state of the test run provided by a first storage node;
obtain the execution state as changed by the first request from the first storage node;
recreate the execution state at a second storage node; and
cause a second request of the test run to be executed by the compute engine, wherein the second request is a stateful request whose output depends on the execution state, and the execution state is provided by the second storage node during the execution of the second request.

Clause 76:

The one or more non-transitory computer-accessible storage media of Clause 75, wherein the program instructions when executed on or across the one or more processors cause the service testing system to:
implement a test manager; and
wherein to obtain the execution state from the first storage node, the program instructions when executed on or across the one or more processors cause the test manager to receive the execution state from the test version of the compute engine; and
wherein to recreate the execution state at the second storage node, the program instructions when executed on or across the one or more processors cause the test manager to send the execution state to the test version of the compute engine.

Clause 77:

The one or more non-transitory computer-accessible storage media of Clauses 75 or 76, wherein the program instructions when executed on or across the one or more processors cause the service testing system to:
record execution data at different points of the test run in a test log; and
compare the test log to a corresponding log produced by a baseline version of the compute engine to generate test results for the test version of the compute engine.

Clause 78:

The one or more non-transitory computer-accessible storage media of any of Clauses 75 to 77, wherein the program instructions when executed on or across the one or more processors cause the service testing system to:
save the execution state changed by the first request; and
execute a third request in another test run using the saved execution state and without re-executing the first request in the other test run.

Clause 79:

The one or more non-transitory computer-accessible storage media of any of Clauses 75 to 78, wherein the program instructions when executed on or across the one or more processors cause the service testing system to:
enable a test mode on the first storage node, wherein the enabling of the test mode causes the first storage node to return the execution state and does not change functionality of the test version of the compute engine.

Clause 80:

The one or more non-transitory computer-accessible storage media of Clauses 75 to 79, wherein the program instructions when executed on or across the one or more processors cause the service testing system to:
recreate the execution state as modified by the first request at a third storage node; and
cause a third request in another test run to be executed using the execution state provided by the third storage node, wherein the third request is executed without re-executing the first request in the other test run.

What is claimed is:

1. A system comprising:
one or more computing devices that implement a service testing system, configured to:
implement a test version of a compute engine of a service;
issue a request to the test version of the compute engine that requires the test version of the compute engine to invoke an external resource that is stateful, wherein output of the external resource depends on an execution state of the external resources prior to the invocation;

record, in a log, execution data of the test version of the compute engine about the invocation of the external resource; and compare the log to a corresponding log produced by a baseline version of the compute engine to generate test results for a regression test of the compute engine, wherein the comparison compares, in the two logs, input data used to invoke the external resource but not output data received from the invocation.

2. The system of claim 1, wherein the service testing system is configured to:

determine recorded output data produced by the external resource during an execution of the baseline version of the compute engine; and provide the recorded output data to the test version of the compute engine to execute the request.

3. The system of claim 2, wherein to provide the recorded output data to the test version of the compute engine, the service testing system is configured to emulate the external resource.

4. The system of claim 1, wherein the external resource is a database or another service distinct from the service under testing.

5. The system of claim 1, wherein the service is an item ordering and shipping service, and external resource is a catalog of items accessed by the item ordering and shipping service.

6. A method comprising:

performing, by one or more computing devices that implement a service testing system:

issuing a request to a test version of a compute engine of a service that requires the test version of the compute engine to invoke an external resource that is stateful, wherein output of the external resource depends on an execution state of the external resources prior to the invocation;

recording, in a log, execution data of the test version of the compute engine about the invocation of the external resource; and comparing the log to a corresponding log produced by a baseline version of the compute engine to generate test results for the compute engine, wherein the comparison compares, in the two logs, input data used to invoke the external resource but not output data received from the invocation.

7. The method of claim 6, wherein the test results are generated for a regression test of the test version of the compute engine.

8. The method of claim 7, wherein the baseline version is another test version of the compute engine under testing by the service testing system, and the regression test is performed between the test version and the other test version of the compute engine.

9. The method of claim 6, further comprising performing, by the service testing system:

determining recorded output data produced by the external resource during an execution of the baseline version of the compute engine; and providing the recorded output data to the test version of the compute engine to execute the request.

10. The method of claim 9, wherein:

the providing of the recorded output data to the test version of the compute engine comprises emulating, by a test manager, output of the external resource.

11. The method of claim 9, further comprising:

analyzing an audit log generated by the baseline version of the compute engine to compile test case data including the request; and wherein the recorded output data is determined from the test case data.

12. The method of claim 11, further comprising:

including in the test case data a configuration setting specifying to not compare output data of the external resource.

13. The method of claim 6, wherein the external resource is a database or another service distinct from the service under testing.

14. The method of claim 6, wherein the service is an item ordering and shipping service, and external resource is a catalog of items accessed by the item ordering and shipping service.

15. One or more non-transitory computer-accessible storage media storing program instructions that when executed on or across one or more processors implement a service testing system and cause the service testing system to:

issue a request to a test version of a compute engine of a service that requires the test version of the compute engine to invoke an external resource that is stateful, wherein output of the external resource depends on an execution state of the external resources prior to the invocation;

record, in a log, execution data of the test version of the compute engine about the invocation of the external resource; and compare the log to a corresponding log produced by a baseline version of the compute engine to generate test results for the compute engine, wherein the comparison compares, in the two logs, input data used to invoke the external resource but not output data received from the invocation.

16. The one or more non-transitory computer-accessible storage media of claim 15, wherein the program instructions when executed on or across the one or more processors cause the service testing system to:

perform a regression test of the test version of the compute engine based on the test results.

17. The one or more non-transitory computer-accessible storage media of claim 15, wherein the program instructions when executed on or across the one or more processors cause the service testing system to:

determine recorded output data produced by the external resource during an execution of the baseline version of the compute engine; and provide the recorded output data to the test version of the compute engine to execute the request.

18. The one or more non-transitory computer-accessible storage media of claim 17, wherein to provide the recorded output data to the test version of the compute engine, the program instructions when executed on or across the one or more processors cause the service testing system to emulate the external resource to interface with the test version of the compute engine.

19. The one or more non-transitory computer-accessible storage media of claim 18, wherein to emulate the external resource, the program instructions when executed on or across the one or more processors cause the service testing system to emulate a database or another service distinct from the service under testing.

20. The one or more non-transitory computer-accessible storage media of claim 18, wherein the program instructions when executed on or across the one or more processors cause the service testing system to:

execute a test version of an item ordering and shipping service; and emulate a response from a catalog of items accessed by the baseline version of the item ordering and shipping service.

* * * * *